United States Patent [19]

Horiuchi et al.

[11] Patent Number: 5,434,961
[45] Date of Patent: Jul. 18, 1995

[54] COMPUTERIZED PUBLISHING METHOD AND SYSTEM OF TYPESETTING WITH CONTENT-BASED CLASSIFICATION AND LAYOUT OF MATERIAL

[75] Inventors: Koichi Horiuchi; Yoshio Kobayashi, Nagano; Katsuhiko Kubo, all of Nagano; Susumu Enomoto; Masashi Ishii, both of Kawasaki, all of Japan

[73] Assignees: Fujitsu Limited, Kawasaki; Shinano Mainichi Shimbun Co., Ltd., Nagano, both of Japan

[21] Appl. No.: 43,876

[22] Filed: Apr. 7, 1993

[30] Foreign Application Priority Data

Apr. 9, 1992 [JP] Japan .................... 4-088626

[51] Int. Cl.⁶ .................................... G06F 17/21
[52] U.S. Cl. .............................. 395/144; 395/148
[58] Field of Search .................. 395/144–149; 364/419.1, 419.17, 419.19

[56] References Cited

U.S. PATENT DOCUMENTS

| 3,872,460 | 3/1975 | Fredrickson et al. | 345/1 |
| 4,755,955 | 7/1988 | Kimura et al. | 395/148 |
| 5,179,650 | 1/1993 | Fukui et al. | 395/148 |

FOREIGN PATENT DOCUMENTS 63-89862  4/1988  Japan .
63-111565 5/1988  Japan .
3-176148  7/1991  Japan .

Primary Examiner—Heather R. Herndon
Assistant Examiner—Joseph R. Burwell
Attorney, Agent, or Firm—Staas & Halsey

[57] ABSTRACT

A method and system for laying out and typesetting in a computerized publishing system comprises the steps of: grouping materials to be laid out on a type area of a page according to theme of articles to define a plurality of theme families, classifying the plurality of articles into a variable article type and fixed article type by adding an identifier, giving a rank to each of the theme families and to the articles, adding information to each of the materials for specifying the size of the materials that are to be laid out on the type area and further for specifying the rank of the theme family and the article, storing the materials into a file together with the information, laying out the materials based upon the information by reading the content of the file to determine a page layout while referencing to a knowledge base, and typesetting a page based upon the page layout to create a typeset, wherein the step of laying out the materials including a step of modifying said page layout based upon a result of the step of typesetting.

14 Claims, 33 Drawing Sheets

FIG.5

| 12 |
|---|
| BNO, RNO, LNO |
| ID, HEADING |
| SIZE |
| RESULT OF SIML |

FIG. 6A

TYPE AREA: 0123AA60  
NO OF COLUMN: 12  REAL: 0%  PROVISIONAL: 99%

| | B NO | R NO | L NO | RANK | THEME | TYPE | ID | ORDER OF PROC |
|---|---|---|---|---|---|---|---|---|
| KEY TOP → ARTICLE | 1 | 0 1 2 3 4 5 6 | 0 0 0 0 0 0 1 | ◎ | ◎ FAMILY -1 | HL HD SH HD BX TX | | 7 |
| | 2 | 0 1 2 3 | 0 0 0 1 | | ◎FAM -2 | HD HL TX | | 9 |
| | 3 | 0 1 2 | 0 0 1 | | ◎FAM -3 | HD BX | | 11 |
| | 4 | 0 1 2 | 0 0 1 | | ◎FAM -4 | HD TX | | 12 |
| SEMI-TOP → | 5 | 0 1 2 3 4 | 0 0 0 0 1 | ○ | ○FAM -1 | HD SH HD TX | | 8 |
| | 6 | 0 1 2 | 0 0 1 | | ○FAM -2 | HD TX | | 10 |
| | 7 | 0 1 2 | 0 0 1 | | IND-1 | HD TX | | 5 |
| | 8 | 0 1 2 | 0 0 1 | | IND-2 | HD TX | | 6 |
| 13: VARIABLE | 9 | 0 1 2 | 0 0 1 | △ | F-1 | HD TX | | 13 |
| 14: FIXED | 80 | 0 1 | 0 0 | ☐ | FIX-1 | BX | | 1 |
| | 81 | 0 1 | 0 0 | ☐ | FIX-2 | BX | | 2 |
| | 82 | 0 1 | 0 0 | ☐ | FIX-3 | BX | | 3 |
| | 83 | 0 1 | 0 0 | ☐ | FIX-4 | BX | | 4 |

IDENTIFIER

FIG. 6B

| FIN | TOP POSITION RIGHT COL | SIZE LINE | LOCATION INFO 1st COL | DIR | IND | COL | REL POS IN TYPE AREA |
|---|---|---|---|---|---|---|---|
| NOT KEY | 1 | 44 | | | | | 1 R |
| NOT KEY | 5 | 10 | | | | | 2 R |
| NOT KEY | 4 | 6 | | | | | 2 R |
| NOT KEY | 3 | 3 | | | | | 2 R |
| NOT KEY | 3 | 23 | | | | | 2 L |
| NOT KEY | 1 | 72 | | | | | - |
| NOT KEY | 4 | 8 | | | | | |
| NOT KEY | 2 | 17 | | | | | |
| NOT | 1 | 49 | | | | | |
| NOT KEY | 4 | 4 | | | | | |
| NOT KEY | 1 | 55 | | | | | |
| NOT KEY | 3 | 6 | | | | | |
| NOT | 1 | 33 | | | | | |
| NOT KEY | 5 | 12 | | | | | |
| NOT KEY | 4 | 3 | | | | | |
| NOT KEY | 3 | 3 | | | | | |
| NOT KEY | 1 | 66 | | | | | |
| NOT KEY | 3 | 6 | | | | | |
| NOT KEY | 1 | 37 | | | | | |
| | | | 10 | R | Y | 1 | |
| NOT KEY | 1 | 6 | | | | | |
| NOT KEY | 1 | 7 | | | | | |
| | | | 10 | R | Y | 2 | |
| NOT KEY | 2 | 3 | | | | | |
| NOT KEY | 1 | 6 | | | | | |
| NOT KEY | 1 | 4 | | | | | |
| NOT KEY | 1 | 21 | | | | | |
| NOT KEY | 6 | 9 | 1 | R | | 6 | |
| NOT KEY | 6 | 9 | 7 | R | | 6 | |
| NOT KEY | 2 | 12 | 11 | L | | 2 | |
| NOT KEY | 1 | 61 | 12 | L | | 1 | |

Annotations:
- "10 R Y 1" — TO THE RIGHT / INDENT
- "1 R 6" — TO THE RIGHT
- "7 R 6" — TO THE LEFT

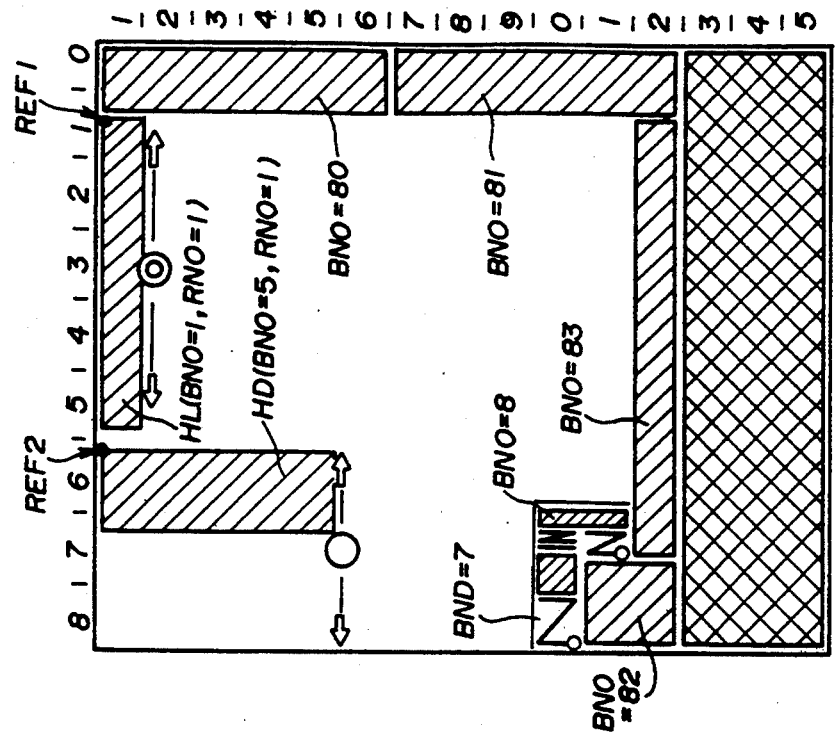
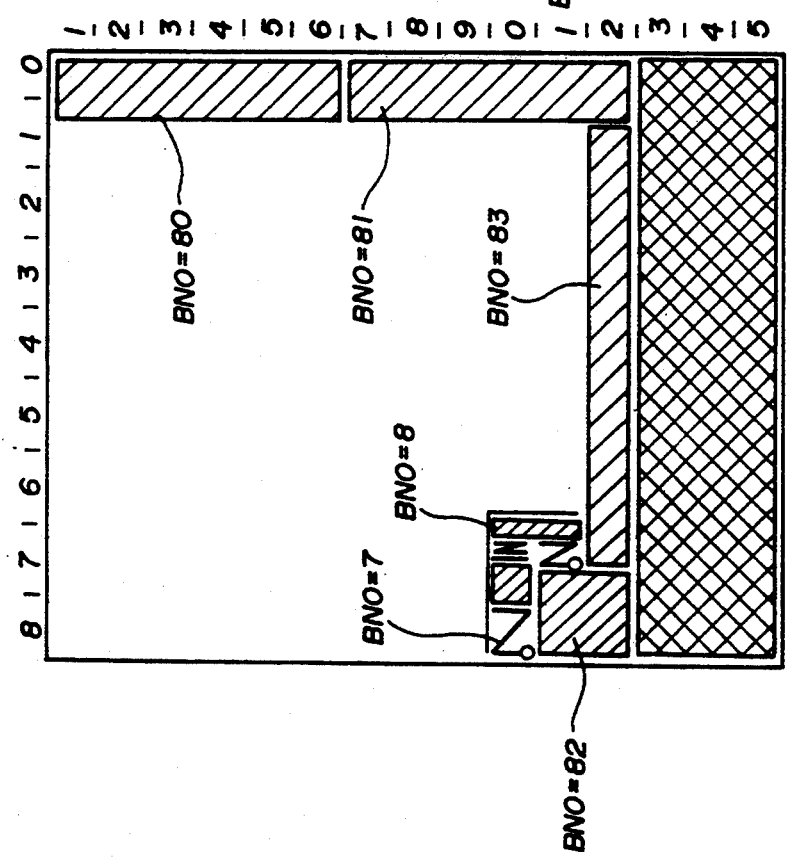

FIG. 10

TYPE AREA: 0123AA60
NO OF COLUMN: 12

| B NO | R NO | L NO | RANK | THEME | TYPE | PREVIEW INFO ||||||| LAYOUT INFO |||||||
|---|---|---|---|---|---|---|---|---|---|---|---|---|---|---|---|---|---|---|---|
| | | | | | | RFE COLM | REF LINE | POS | DIREC | CHAR POS | ORDER | | REF COLM | REF LINE | NO COLM | FOLD | DIR | +/- | TXT COL | ORDER |
| 1 | 0-6 | 000000-1 | ◎ | ◎ FAMILY-1 | HD HD SH HD BX TX | 1 | 10 | 1,2,2,2,2 | R,R,R,R,L | 0,0,0,0,0 | 1,2,3,4,5 | 1 | 10 | 4 | 7 | R | 0 | 2 | 12 |
| 2 | 0-3 | 000-1 | | ◎ FAMILY-2 | HD HL TX | | | | | | | | | | | | | |
| 3 | 0-2 | 00-1 | | ◎ FAM-3 | HD TX | | | | | | | | | | | | | |
| 4 | 0-2 | 00-1 | | ◎ FAM-4 | HD TX | | | | | | | | | | | | | |
| 5 | 0-4 | 0000-1 | ○ | ○ FAMILY-1 | HD SH HD TX | 1 | 56 | 1,1,1 | R,R,R | 0,0,0 | 1,2,3 | 1 | 54 | 6 | 1 | L | 0 | 1 | 8 |
| 6 | 0-2 | 00-1 | | ○ FAMILY-2 | HD TX | | | | | | | | | | | | | |
| 7 | 0-2 | 00-1 | | IND-1 | HD TX | | | | | | | | | | | | | |
| 8 | 0-2 | 00-1 | | IND-2 | HD TX | | | | | | | | | | | | | |
| 9 | 0-2 | 00-1 | △ | F-1 | HD TX | | | | | | | | | | | | | |

LEFT INDENT

RIGHT INDENT

FOLD

NATURAL

FIG. 17

| | BND=6 | BND=5 | BND=4 | BND=3 | BND=2 | BND=1 |
|---|---|---|---|---|---|---|
| | IND | CONT | IND | IND | CONT | FOLD |
| | same | same | same | same | IND | CONT |
| COND | NO | YES | NO | NO | NO | |

15

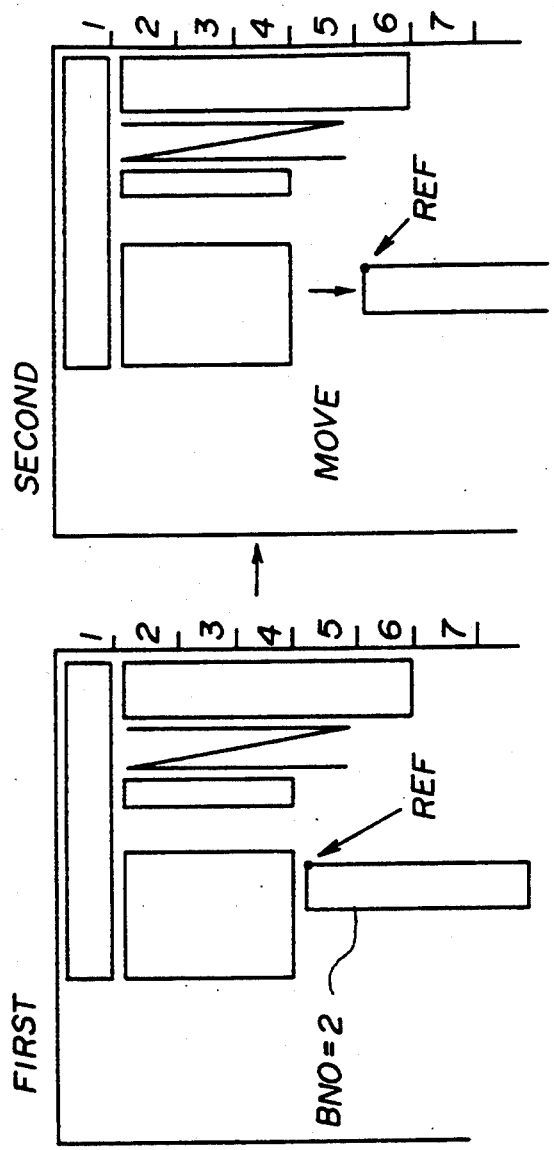

COMPUTERIZED PUBLISHING METHOD AND SYSTEM OF TYPESETTING WITH CONTENT-BASED CLASSIFICATION AND LAYOUT OF MATERIAL

BACKGROUND OF INVENTION

The present invention generally relates to the art of layout and typesetting and more particularly, to a computerized method and system of layout and typesetting.

In newspapers and magazines, the process for typesetting for building up a page from texts, headlines, photographs, and the like, generally includes the steps of:

(1) determining a layout; and
(2) typesetting.

In the example of publishing a newspaper, the step of layout is achieved by an expert specialized in the art of layout, while the step of typesetting is conducted by another expert of the production division. There, the step of layout has not yet been computerized, while the step of typesetting is achieved by using a computer system wherein the operator places each material in a predetermined location based upon a given layout by using commands. Because of this, there has been a problem in that it takes about 20 minutes for determining the layout and another 20 minutes for typesetting.

In the process of layout, the personnel is required to have ample experience for laying out materials such as vertical and lateral highlightings, headings and subheadings, texts and photographs, so that a reader can recognize the important materials at a glance. The layout thus decided is in the form of a sketch of a page and is handed over to the personnel of the production division. There, the personnel at the production division sets up a typeset for printing by using a computerized typesetting system that requires complicated commands for operation. Thereby, it has been necessary to dedicate considerable time and expense for obtaining an expert in the art of layout and production.

Thus, there is a substantial demand for a fully computerized publishing system wherein the step of layout can be conducted by inexperienced personnel based upon information stored in a knowledge base, and wherein the step of typesetting is achieved automatically by issuing appropriate commands based upon the determined layout.

SUMMARY OF THE INVENTION

Accordingly, it is a general object of the present invention to provide a novel and useful computerized publishing process and system wherein the foregoing problems are eliminated.

Another and more specific object of the present invention is to provide a computerized publishing process and system wherein the process of layout and the process of typesetting are achieved consecutively with an interlinking established between the foregoing two processes, such that the process of typesetting is achieved automatically based upon the result of layout obtained in the step of typesetting, and such that an operator can correct the layout based upon the result of the typesetting thus achieved.

Another object of the present invention is to provide a method for layout and typesetting in a computerized publishing system, the method comprising the steps of:

grouping together materials that are to be laid out on a type area of a page according to an article theme so as to define a plurality of theme families wherein each of these theme families contains a plurality of articles that share a common theme, and such that each of said articles contains a plurality of materials;

classifying said plurality of articles into a variable article type wherein the materials belonging thereto have variable sizes and locations on said type area from issue to issue in a publication, and to a fixed article type wherein the materials belonging thereto have a fixed size and location on said type area from issue to issue, said step of classifying said articles comprising a step of adding an identifier to each of said plurality of articles for identifying whether said article is of a variable article type or of a fixed article type;

assigning a theme rank to each of said theme families;

assigning an article rank to each of said articles;

adding information, in each of said articles of said variable article type, to each of the materials that belong to said article, for specifying the size of the materials that are to be laid out on the type area and further for specifying the theme rank and the article rank of the article to which said materials belong to;

storing said materials into a file together with said information;

laying out said materials based upon said information added thereto by reading out said materials from said file so as to determine page layout, said step of laying out being conducted based upon said information while referring to a knowledge base that stores rules of layout; and typesetting a page based upon said page layout to create a typeset, said step of typesetting being conducted while referring to a knowledge base that stores rules of typesetting;

said step of laying out said materials including a step of modifying said page layout based upon a result of said step of typesetting.

Another object of the present invention is to provide a computerized publishing system wherein a layout is determined with the aid of a knowledge base, based upon information about the materials that are to be laid out to form a page, and further in view of the result of a provisional typesetting.

Another object of the present invention is to provide a computerized publishing system, comprising:

information preset means for grouping together materials that are to be laid out on a type area of a page according to the theme of each article so as to define a plurality of theme families such that each of said theme families contains a plurality of articles that share a common theme, and such that each of said articles contains a plurality of materials. The above information preset means also has a function of classifying said plurality of articles into either a variable article type, wherein the materials belonging thereto have variable size and location on said type area in from issue to issue, or a fixed article type, wherein the materials belonging thereto have fixed size and location on said type area within each issue, by adding an identifier to each of said plurality of articles, for identifying whether said article is a variable article type or a fixed article type, the information preset means further assigning a theme rank to each of said theme families, assigning an article rank to each of said articles, and adding information, in each of said articles of said variable article type, to each of the materials that belong to said article, for specifying the size of the materials that are to be laid out on the type area and for further specifying the theme rank and the article rank of the article to which said materials belong to;

preview layout means for laying out said materials based upon said information added thereto by reading out said materials from said file to determine a page layout, said preview layout means conducting layout based upon said information while referring to a knowledge base that stores rules of layout;

layout modification means supplied with said preview layout from said preview layout means for modifying the same to produce a page layout;

command generating means for generating commands for carrying out typesetting based upon said page layout;

typesetting means supplied with said commands from said command generating means for creating a typeset; and feedback means for feeding back said typeset to said layout modification means as a page layout.

According to the present invention, one can correct the layout as desired based upon the result of the typesetting. Thereby, an efficient page layout can be achieved. In the present invention, the materials forming a page are organized into a plurality of articles that in turn form a plurality of theme families, wherein the theme families are classified into variable theme family type and a fixed theme family type. There, it is possible to employ an expert system to layout the materials on the type area of the page, based upon the identifier of the article as well as based upon the rank of the article and the type of the materials. Thereby, an inexperienced operator can achieve the layout and typesetting process with the aid of the knowledge base of the expert system.

Other objects and further features of the present invention will become apparent from the following detailed description when read in conjunction with the attached drawings.

BRIEF DESCRIPTION OF THE DRAWINGS

FIG. 5 is a diagram showing an example of the contents of a file used in the system of FIG. 3 for storing materials;

FIG. 6 is a diagram showing an example of the table displayed in the system of FIG. 3 for conducting the inputting process of FIG. 4;

FIGS. 8(A)-8(H) are diagrams showing the progress of layout conducted in the system of FIG. 3;

FIG. 10 is a diagram showing the result of the preview layout;

FIG. 17 is a diagram showing candidates of text layout style that can be employed in the page layout process;

FIGS. 27(A)-27(C) are diagrams showing the process for re-adjusting a layout.

DETAILED DESCRIPTION OF PREFERRED EMBODIMENTS

First, the outline of the present invention will be described with reference to a flowchart of FIG. 1 and an example of layout process shown in FIG. 2.

Figure 1:
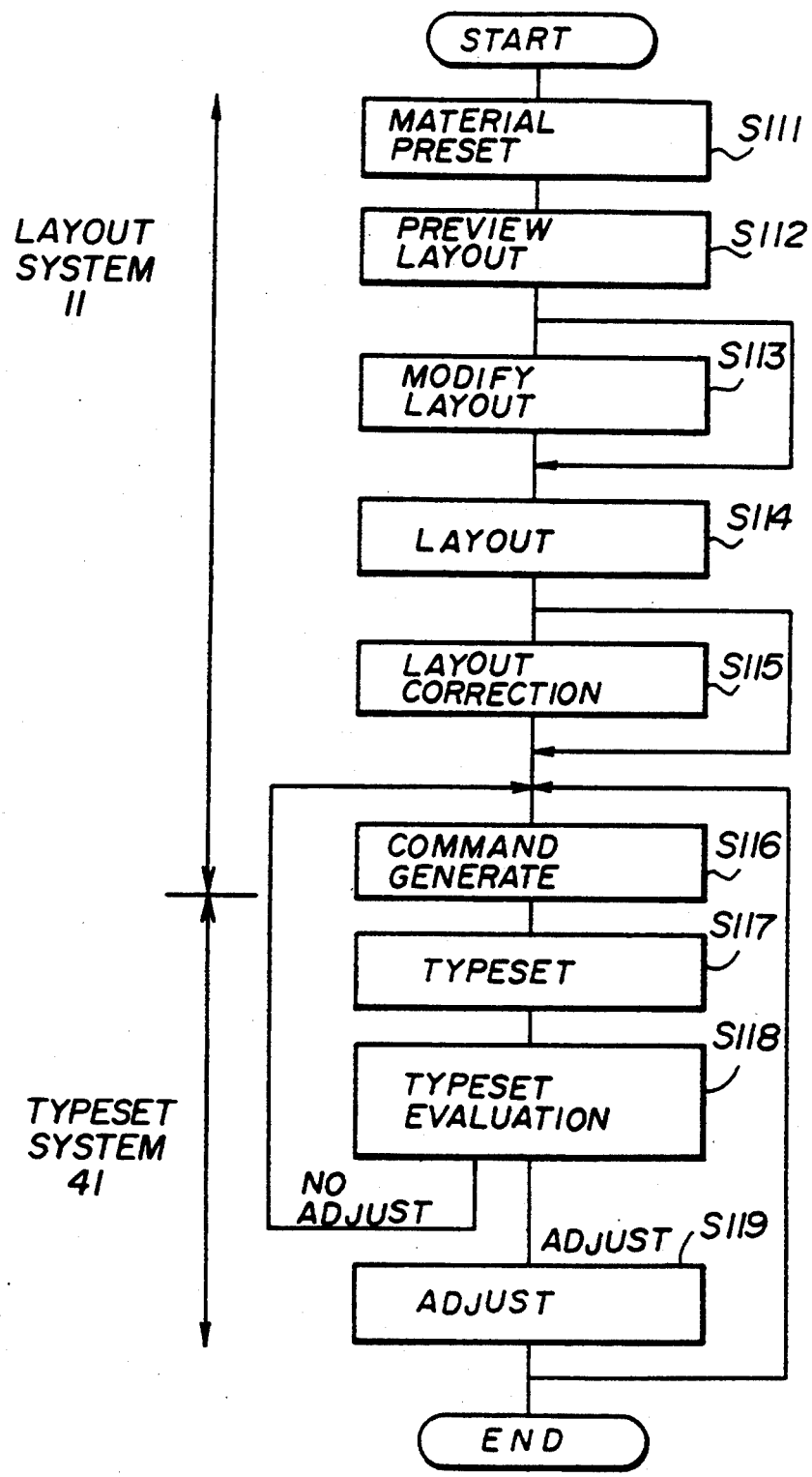
FIG. 1 is a flowchart showing the overall process of the present invention.
Figure 2:
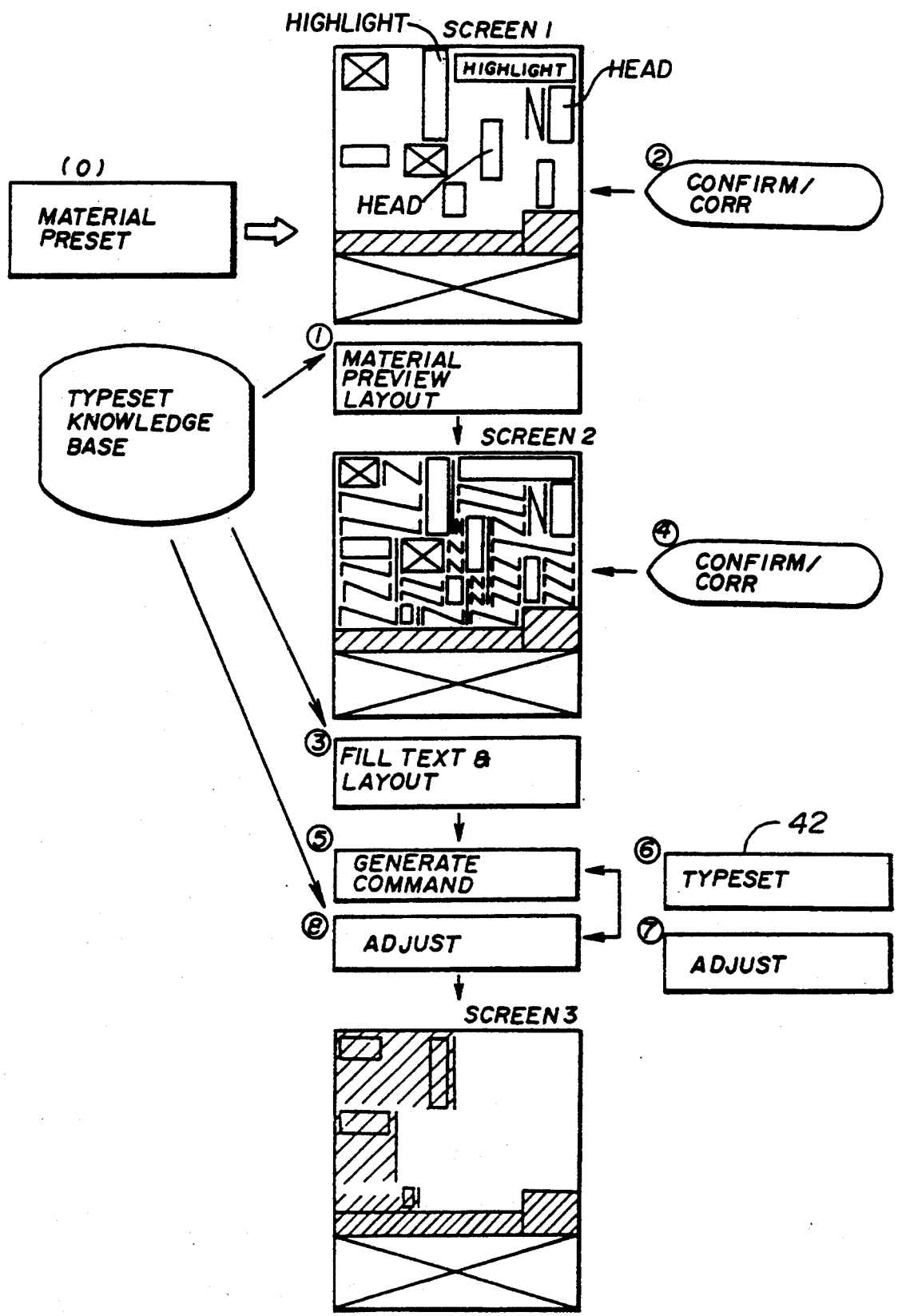
FIG. 2 is a diagram showing the progress of layout and typesetting achieved in the process of FIG. 1.

Referring to FIG. 1, the process of the present invention starts with a step 111 for presetting the information about the materials that are to be laid out on a type area of a page. The word "material" used herein represents the elements that form a page of newspaper or magazine and includes headings, sub-headings, photographs and corresponding explanations, texts, tables, boxed columns, lines, highlightings, and the like.

In the step 111, materials are arranged to form a number of articles, and the articles are classified according to theme so as to form a number of theme families. Further, the information indicative of the material type is attached to each material. The material types include the size of the material and the location at which the material is to be placed. Further, each article is assigned a rank indicative of the importance of the article theme as well as information indicating whether the layout of the article can be varied by an operator or not. An example of a non-variable article would be a boxed article appearing everyday at a predetermined position of a page with a predetermined size, such as weather forecast or the logo of the newspaper. On the other hand, the rest of the theme articles generally belong to the variable article type.

Next, in the step 112, the materials thus classified in the step 111 are subjected to a preview layout process, wherein major materials are laid out on a type area of a page. Here, the phrase "major material" indicates a material such as highlighting, heading, sub-heading, pictures, and so on, which has a generally rectangular form. The text of the article is not included in the major material, as the text is consequently "poured" into the area formed between the major materials after the layout of the major materials is completed. There, the layout of the major materials is assisted by a knowledge base such that an optimum layout is achieved even when the operator lacks the experience in the art of layout.

In the step 112, the major materials are placed on the type area of the page according to a predetermined order of priority that is given to each article. More specifically, the major materials forming the fixed, non-variable articles are first placed at respective, predetermined locations. After the major materials for the non-variable articles are thus placed, the headline article having the highest rank is placed either at the upper right corner or the upper left corner of the unoccupied area. Next, the sub-headline article is placed at the upper right corner or the upper left corner of the unoccupied area that is not occupied by the headline article or by non-variable articles. It should be noted that one or more articles are generally associated with each of the headline article and the sub-headline article, thus forming a theme family. In the Japanese language newspapers, the subordinate articles in a theme family are generally disposed below the top rank article in that family, and the headline article and the sub-headline article are generally aligned laterally at the top column of the page. There, the upper right corner or the upper left corner of the area of the headline article or the sub-headline article provides the origin or reference point of the entire article family. Further, the major materials are displaced in each area of the headline article and the sub-headline article according to a rule stored in an expert system. For example, there is a rule to determine the lateral sizes of the areas allocated to the headline and sub-headline articles according to the physical size of the highlighting, provided that the highlighting is a laterally extending one. When the highlighting extends vertically, the total width of the major materials provides the lateral size of the article area. Further, there is a rule that the pictures are to be disposed at the upper right corner or at the upper left corner. Thereby, a SCREEN 1 shown in FIG. 2 is obtained. The process of the step 112 will be described in detail with reference to the flowchart of FIG. 7.

In the step 113, the layout of the major materials is modified while using the knowledge base of the expert system. Further, in the step 114, the area for the text is secured in correspondence to the area formed between the major materials. Thereby, a provisional layout is determined as shown in SCREEN 2 of FIG. 2. Further, in a step 115, the layout is corrected by adjusting the size and location of the major materials such that the entire text is accommodated into the space that is allocated to the text. After the layout is thus determined in the step 115, commands for controlling a typesetting system 41 are created in a step 116. Thereby, the steps 111–116 are conducted in a layout system 11. The process of the step 113 will be described in detail with reference to the flowchart of FIG. 12, while the process of the step 114 will be described with reference to the flowchart of FIG. 13. Further, the process of the step 115 will be described later with reference to FIG. 18. The process of the step 116, on the other hand, will be described with reference to FIGS. 21 and 22.

In the typesetting system 41, a step 117 is conducted for achieving a typesetting according to the command issued in the step 116, wherein the materials are placed consecutively in each theme family so as to fill the area that is allocated to that theme family according to a predetermined order of priority. There, in a step 118, the typesetting system 41 evaluates the result of typesetting with respect to the underflow or overflow of the materials and adjusts the size of the area such that the area is filled substantially completely by the materials. When there is an overflow or underflow of text, the width of the allocated area is increased or decreased and the typesetting process of the step 117 is conducted again. In the newspaper of the Japanese language, the lines of text extend vertically and from right to left, and widening of the available area results in an increase in the number of the lines accommodated in the area, or vice versa. The result of the typesetting thus obtained is then stored in a typesetting file in the form of page layout, and the page layout is then fed back from the typesetting system 41 to the layout system 11 in the form of commands. Thereby, one can further refine the layout in the layout system 11. The general process of the typesetting will be described with reference to FIG. 22(A), while the process of the step 117 will be described with reference to FIG. 22(B). Further, the process of the steps 118 and 119 will be described in detail with reference to FIG. 23.

According to the process described above, one can achieve an efficient typesetting supported by the knowledge system, even without having ample experience in the layout or typesetting.

Figure 3:
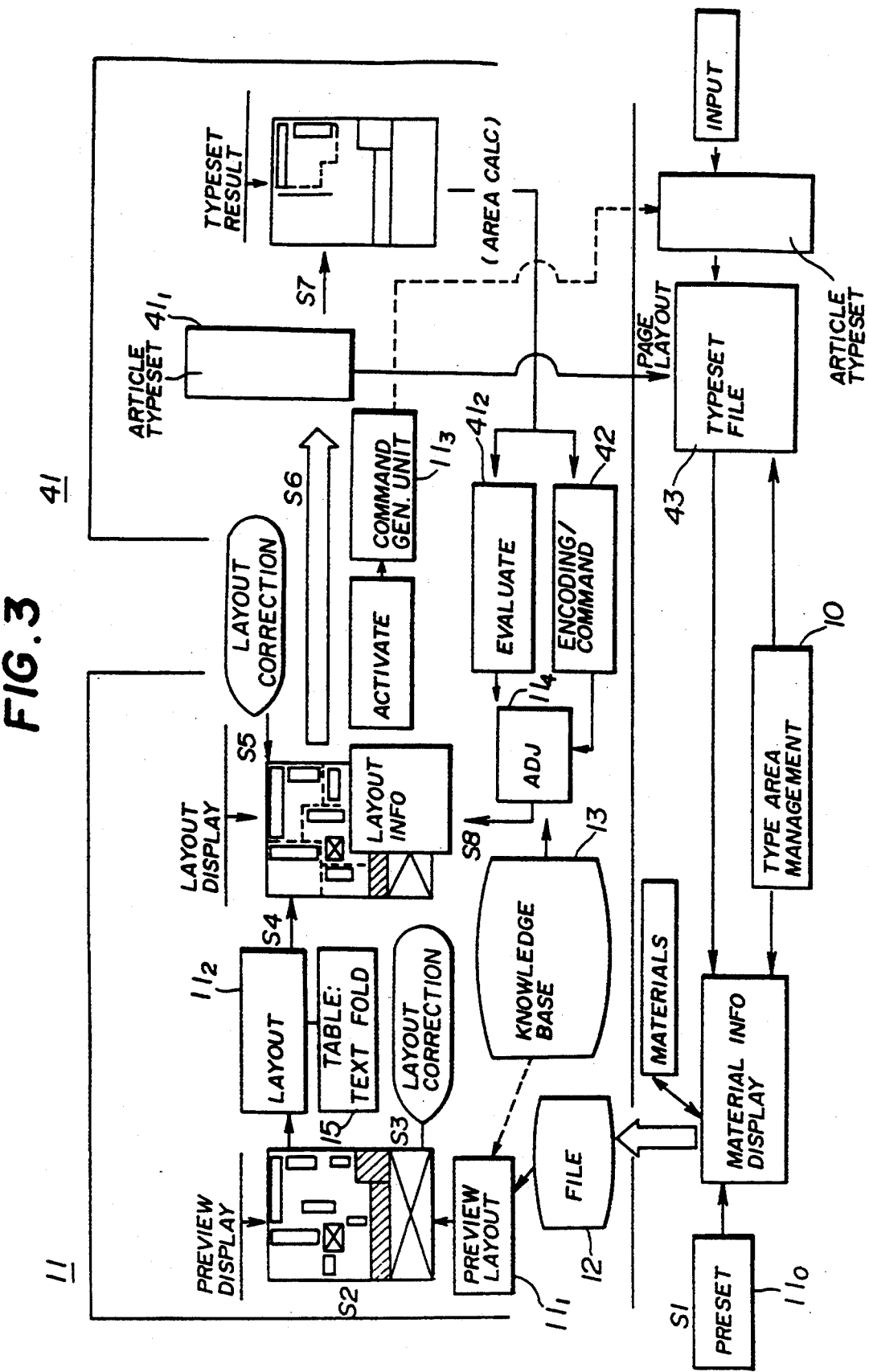
FIG. 3 is a diagram showing the overall construction of a computerized publishing system and process according to an embodiment of the present invention.

Hereinafter, a first embodiment of the present invention will be described with reference to FIG. 3, wherein FIG. 3 shows the flow of events that takes place in the layout system 11 and the typesetting system 41.

Referring to FIG. 3, the materials are displayed on a screen in a step S1 and the operator inputs various information as described previously, such as the theme family, rank of the article, location and size of the materials, and the like, in correspondence to each of the materials by means of a pointing device $11_0$ such as a mouse or keyboard. Thereby, it should be noted that a type area management unit 10 controls the display such that only materials for the type area under consideration are displayed on the screen. The materials thus associated with the corresponding information are then stored in a file 12 provided in the layout system 11. There, the pointing device $11_0$ achieves the process of the step 111 of FIG. 1.

In a step S2, a preview layout unit $11_1$ achieves a process corresponding to the step 112 of FIG. 1 by reading out the content of the file 12 to achieve a preview layout process. Thereby, the preview layout unit $11_1$ refers to a knowledge base 13 for the knowledge stored therein, the major materials are laid out on the type area of a page, and the operator corrects the preview layout in a step S3 in correspondence to the step 113 of FIG. 1. This process of layout correction is also conducted under control by the unit $11_1$ with the aid of the knowledge base 13.

After the preview layout is thus determined, a layout of the materials is conducted in a step S4 by a layout unit $11_2$. There, the unit $11_2$ refers to a table 15 that stores therein various possible styles of folding a text to form one or more text columns, and the unit $11_2$ searches for an allowable style of folding text in view of the layout of the major materials. Thereby, the result of provisional page layout including the area for the text is displayed on a screen in a step S5 together with related layout information. Thereby, the steps S4 and S5 correspond to the step 114 of FIG. 1.

After the step S5, a command generating unit $11_3$ carries out a process of issuing commands based upon the page layout determined in the previous step S5, as indicated by a step S6. Thereby, the step S6 corresponds to the step 116 of FIG. 1.

The commands thus issued by the unit $11_3$ are supplied to a typesetting unit $41_1$ included in the typesetting system 41, for typesetting. Thereby, the typesetting is achieved for each of the article themes, and the result of the typesetting is stored in a typeset file 43. Further, the result of the typesetting is displayed on a screen in a step S7. The process of the typesetting herein corresponds to the step 117 of FIG. 1.

There, an evaluation unit $41_2$ evaluates the result of the typesetting as to whether or not the typesetting has been made successfully. Further, information indicative of the result of typesetting is provided to an encoding unit 42 that issues a series of commands indicative of the result of the typesetting; the commands thus issued are supplied to an adjustment unit $11_4$ for modifying the result of the layout in correspondence to a step S8. Here, it will be noted that the unit $41_2$ and the unit 42 conduct a process corresponding to the step 118 of FIG. 1, while the unit $11_4$ conducts a process corresponding to the step 119.

In response to the commands from the unit 42 as well as in response to the message from the unit $41_2$, the adjustment unit 114 increases or decreases the width of the area for each article, such that the materials including the text are accommodated into the allocated article area without overflow or underflow. Thereby, the unit $11_4$ refers to the knowledge base 13 for the rules of adjustment.

According to the system and process of FIG. 3, it will be noted that an inexperienced personnel can conduct the complicated work of layout and typesetting efficiently, with the assistance of the knowledge base 13. Hereinafter, each process of FIG. 3 will be described.

Figure 4:
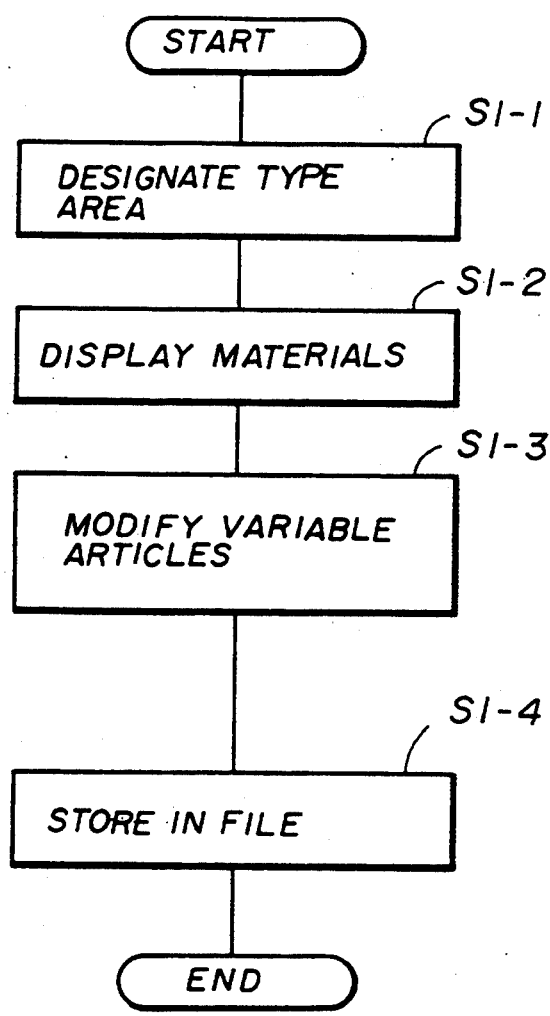
FIG. 4 is a flowchart showing the process of inputting material information employed in the system of FIG. 3.

FIG. 4 shows a flowchart of the step S1 for presetting the information of the materials such as texts, headings, highlightings, pictures, advertisements, and the like that are to be laid out on the type area. More specifically, the flowchart represents the process for inputting information necessary for preview layout of these materials.

Referring to FIG. 4, the process starts with a step S1-1 for designating the type area. There, the operator inputs the name of the type area via a suitable input device that may be the input device $11_0$. In response to this, the type area management unit 10 displays in a step S1-2 the list of the materials that are to be laid out on a designated type area. For example, the screen used in the previous day for listing the materials may be displayed as represented in FIG. 6 of which a description will be given later.

Next, in a step S1-3, a correction is entered into the displayed list of materials for updating the information listed therein with respect to those materials of which layout is updated everyday. The materials thus modified form the variable articles explained before. The process of updating may be conducted with regard to: (a) addition, modification or cancellation of article family; (b) ranking of the article according to theme; (c) size of the materials, and the like. Further, in a step S1-4, the materials thus attached with the information are stored in the file 12 together with the information indicative of the type area on which the materials are to be laid out.

FIG. 5 shows the content of the file 12, wherein the file 12 includes, for each field defined therein and allocated to a page area: the group information that in turn contains a block number designated as BNO, a record number designated as RNO, and a line number designated as LNO; identification of the materials that are to be laid out such as identification of the material (ID), heading, and the like; control information for the layout such as the size of each material; and the result of the simulation. There, a block number BNO is given to each of the articles and each material belonging to an article is given a corresponding record number RNO. Further, the line number LNO is used to identify a text.

FIG. 6 shows an example of the screen shown in the step S1 of FIG. 3.

Referring to FIG. 6, the table shown herein corresponds to the layout of a Japanese newspaper and the designation "0123AA60" indicates the type area that is to be laid out. Further, it is indicated that the type area includes twelve columns in the vertical direction. In Japanese newspapers, each line of text extends vertically with a predetermined number of characters and the vertical lines of text are formed from the right to the left to form a column. Thereby, the column has a predetermined vertical height corresponding to the number of characters included in the line and extends laterally with a variable lateral width corresponding to the number of lines. Further, the position of the top column is set to the right in the present case as indicated in the item TOP POSITION. The position of the top column may change depending on whether the type area forms an odd page or even page. In the instance of FIG. 6, it should be noted that the preview layout is a provisional one as indicated by PROVISNL: 99%.

As already mentioned, the designations such as BNO, RNO and LNO represent the block number, record number and the line number respectively. There, each article is given a corresponding BNO and each material in the article is given a corresponding RNO. Further, the text included in each article is given the LNO of "1." Thereby, the BNO is used as the key when referring to an article. Here, it should be noted that the BNOs having the 80th number represent the fixed or non-variable articles explained before, while the articles having the BNOs ranging from 1–9 are the variable articles. Thereby, the BNO acts also as an identifier of the article.

Further, the articles are given a designation of rank as represented by double and single circles, wherein the double circle represents the top or headline article while the single circle represents the semi-top or sub-headline article. Naturally, the headline article and sub-headline article belong to the variable-articles. Further, the articles designated by a triangle represent articles having a lower rank. In addition, the headline article and the sub-headline article are accompanied by related articles sharing a common theme, and the articles are classified according to the theme family as indicated by "double circle family-1," "double circle family-2," . . . .

In the illustrated example, the articles having the BNO ranging from 1 through 4 belong to the headline article family, while the articles having the BNO of 5 and 6 belong to the sub-headline article family.

Each article is formed of a number of materials of different type and is designated by the RNO, wherein "HL" represents the highlighting, "HD" represents the heading, "SH" represents the sub-heading, "BX" represents the boxed column, and "TX" represents the text.

Further, the table of FIG. 6 indicates the order of layout processing. There, the preview layout starts with the non-variable articles, in a predetermined order, and proceeds further to the variable articles. In the variable articles, the preview layout is started first with those articles that are to be laid out with indentation. In the illustrated example, the article 80 is laid out first in the non-variable articles, and the preview layout proceeds in succession to the article 83. Further, in the variable articles, the preview layout starts with the indented articles 7 and 8, and the preview layout proceeds to the articles 1–4. Thereby, the headline article 1 is laid out first and the sub-headline article 5 is laid out next. After the headline article 1 and the sub-headline article 5 are thus laid out, the articles belonging to each theme family are laid out. Finally, the remaining article 9 having a low rank is laid out.

In the column "FIN?" of the table of FIG. 6, a designation is made as to whether or not the layout is completed for each of the materials forming the articles, and the column "SIZE" of FIG. 6 represents the vertical and horizontal size of each material forming the articles. There, the vertical size is represented by the number of columns that are occupied by the material while the horizontal size is represented by the number of lines that are occupied by the material. Generally, the number of characters in each column is set to twelve. Further, by counting the number of vertical lines, one can specify the lateral size of the region that is to be occupied by the material under consideration. It should be noted that the parameter in the column "SIZE" is fixed in the non-variable articles and the operator cannot change the content thereof, while the content of the column "SIZE" in the variable articles can be changed as desired by the operator.

Further, the table of FIG. 6 includes information designated as "LOCATION INFO" that represents the location of the materials on the type area. There, the LOCATION INFO includes the position of the first column "1st COL" for the material in terms of the number counted from the top of the type area, the direction "DIR" of indentation, and the number of the columns "COL" that are to be occupied by the material.

The foregoing information of layout has hitherto been only in the mind of the expert of layout and never been documented. In the process of S1, the preview layout is conducted automatically, based upon the knowledge thus represented in terms of the table of FIG. 6. The example of the preview layout according to the table of FIG. 6 will be described later with reference to FIG. 8(A).

Figure 7:
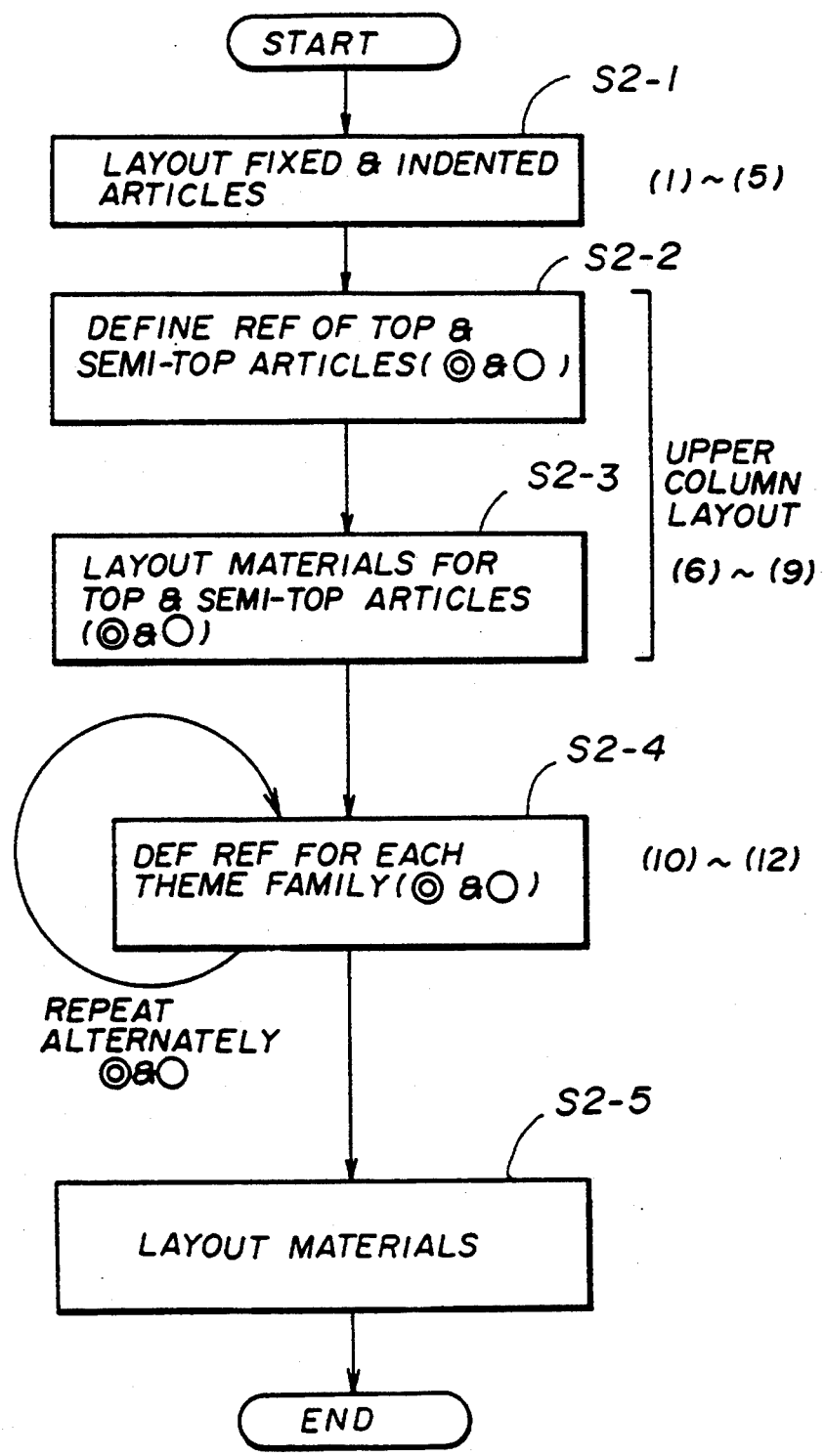
FIG. 7 is a flowchart showing the process of preview layout achieved in the system of FIG. 3.

FIG. 7 shows the flowchart for conducting the preview layout according to the table of FIG. 6. It should be noted that the process of FIG. 7 is conducted following the process of FIG. 4. It should be noted that the process of FIG. 7 corresponds to the process of layout sketch made conventionally by means of paper and pencil, and achieves the layout of the materials, excluding the texts and ruler lines, on the type area, automatically, with an optimum visual effect and without violating rules used in the layout of newspapers. Some of such rules may change, depending upon the language of the newspaper, while some may not change. In the Japanese newspapers, such rules preclude the overlapping of materials, vertical alignment of two or more headings or sub-headings, vertical alignment of starting or ending position of columns, and the like.

As a result of the process of FIG. 7, one obtains a reference coordinate or position as well as relative positional relationship between the major articles that have a rectangular shape. Particularly, the process of the present step determines the vertical position of the columns, while the horizontal position of the columns may be changed depending on the application of text in the later layout stage.

Referring to the flowchart of FIG. 7, the step S2-1 achieves the layout of fixed and indented articles. More particularly, the process of S2-1 extracts those non-variable articles having the BNO of 80–83 as well as the indented articles having the BNO of 7 and 8. Further, the materials included in the articles thus extracted are laid out on the type area according to the type of the material. For example, the headings are indented to the right, the pictures are indented to the left, and so on. Thereby, a preview layout as shown in FIG. 8(A) is obtained. There, it will be noted that the type area of the page is divided vertically into twelve columns, and the non-variable articles 80–83 as well as the indented articles 7 and 8 are laid out according to the LOCATION INFO of FIG. 6. It will be noted, for example, that the article having the BNO of 80 is a boxed column in conformity with the description in the TYPE of FIG. 6 and is located at the first column with an indentation to the right also in conformity with the information listed in LOCATION INFO of FIG. 6. Further, the article 80 extends vertically by a height corresponding to six columns also in conformity with the description in the LOCATION INFO. It should be noted that the size of the article 80 is also specified by the information in the SIZE, wherein the lateral width of the article is set to include nine lines, while the vertical height of the article is set to include six columns.

After the preview layout of FIG. 8(A) is determined as such, a step S2-2 is conducted as shown in FIG. 7 for determining a reference point of the layout of those materials included in the variable type articles. More specifically, a reference point REF1 for the headline article (BNO=1) and a second reference point REF2 for the sub-headline article (BNO=5) are determined consecutively. There, reference point REF1 is defined at the upper right corner of the unoccupied type area. Further, the lateral width of the headline article is defined by the lateral size of the highlighting that extends laterally, as shown in FIG. 8(B). In FIG. 8(B), the highlighting designated as BNO=1, RNO=1 defines the lateral size of the area for the headline article having the block number of BNO=1. After the lateral size of the headline article is thus defined, the reference point REF2 is defined at the upper right corner of the unoccupied type area as the reference point for the sub-heading article designated as BNO=5.

Figure 8D:
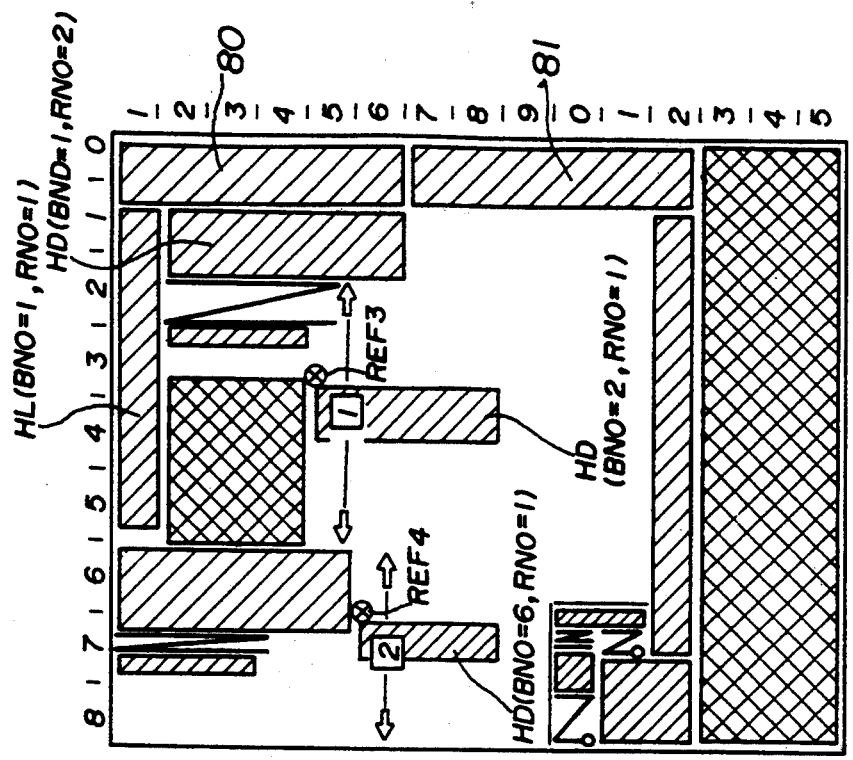
Figure 8C:
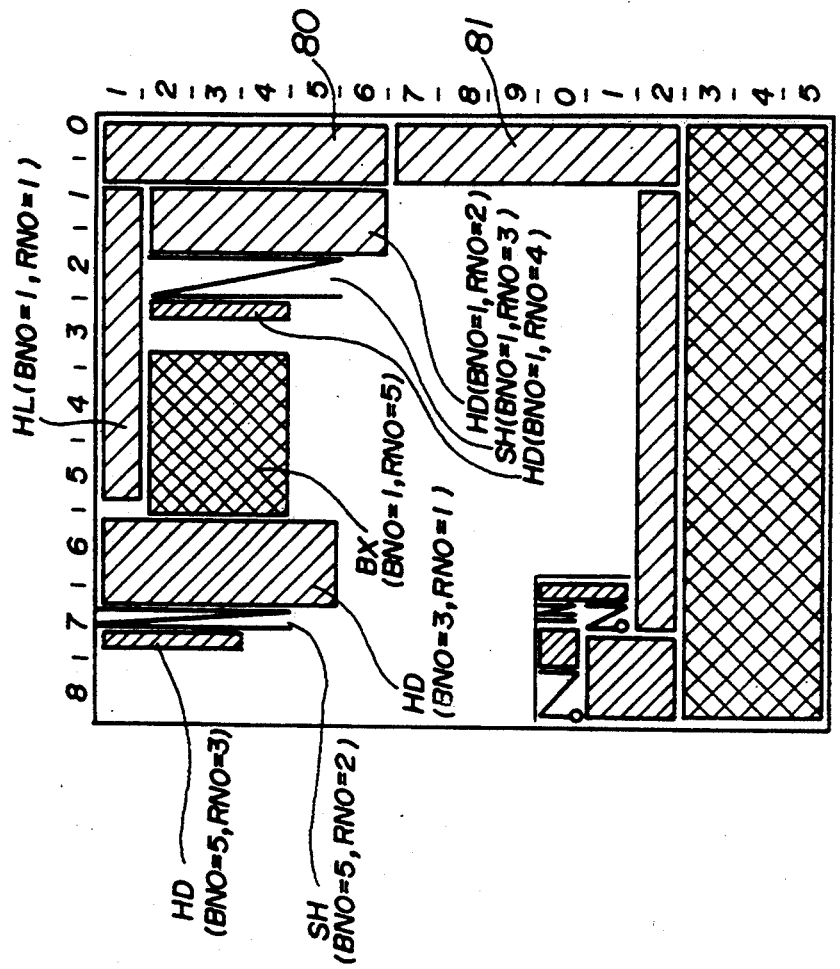

After the type area is determined as shown in FIG. 8(B), a step S2-3 of FIG. 7 is conducted for laying out the materials for the headline article (BNO=1) and the sub-headline article (BNO=5), wherein the heading (BNO=1, RNO=2), the sub-heading (BNO=1, RNO=3), the second heading (BNO=1, RNO=4), and the boxed column (BNO=1, RNO=5) are laid out consecutively on the type area for the headline article. There, the heading, subheading and the second heading are laid out starting from the right edge of the type area and proceeding to the left, while the boxed column is indented to the left. In the type area for the sub-headline article, those materials such as the heading (BNO=5, RNO=1), the sub-heading (BNO=5, RNO=2), and the second heading (BNO=5, RNO=3) are laid out consecutively starting from the right edge of the area. Thereby, a layout shown in FIG. 8(C) is obtained. It should be noted that the process of S2-2 and S2-3 thus conducted achieves the layout of the materials for the top column of articles such as the headline and sub-headline articles.

After the layout shown in FIG. 8(C) is obtained, the layout of a lower column is started with a step S2-4 of FIG. 7.

Figure 8F:
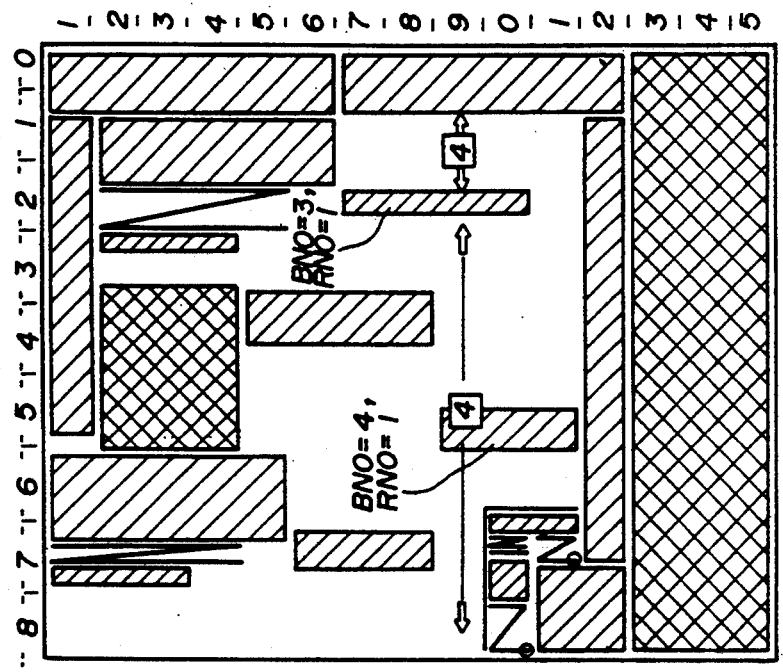
Figure 8E:
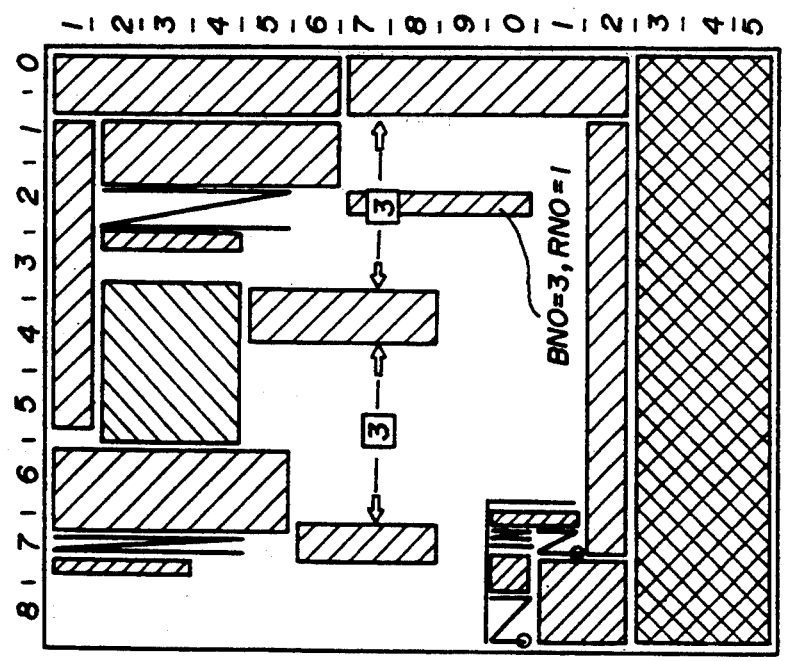

There, in the step S2-4, the reference point is determined for the second column articles, such as the article having the BNO of 2 (BNO=2) and the article having the BNO of 6 (BNO=6) wherein the former article belongs to the same theme family as the headline article (BNO=1) while the latter article belongs to the theme family of the sub-headline article (BNO=5). More specifically, the reference point of the former article (BNO=2), designated as REF3 in FIG. 8(D), is set in correspondence to the middle of the type area of the headline article and is urged in the upward direction up to the lower boundary of the type area of the headline article. Similarly, the reference point of the latter article (BNO=6) is designated in FIG. 8(D) as REF4 and is urged in the upward direction to the lower boundary of the type area of the headline article. Each time the reference points REF3 and REF4 are thus defined, a corresponding heading is laid out as indicated in FIG. 8(D) as (BNO=2, RNO=1) or (BNO=6, RNO=1) as shown in FIG. 8(D). Further, the step S2-4 is repeated for the subsequent columns, and the headings designated as (BNO=3, RNO=1) or (BNO=4, RNO=1) are laid out as shown in FIGS. 8(E) and 8(F) according to the same rules.

Figure 8H:
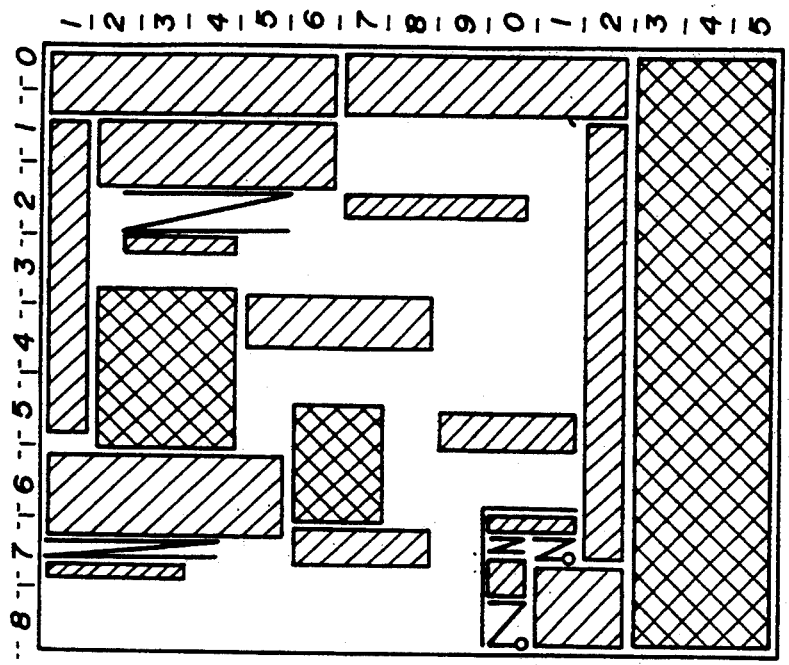
Figure 8G:
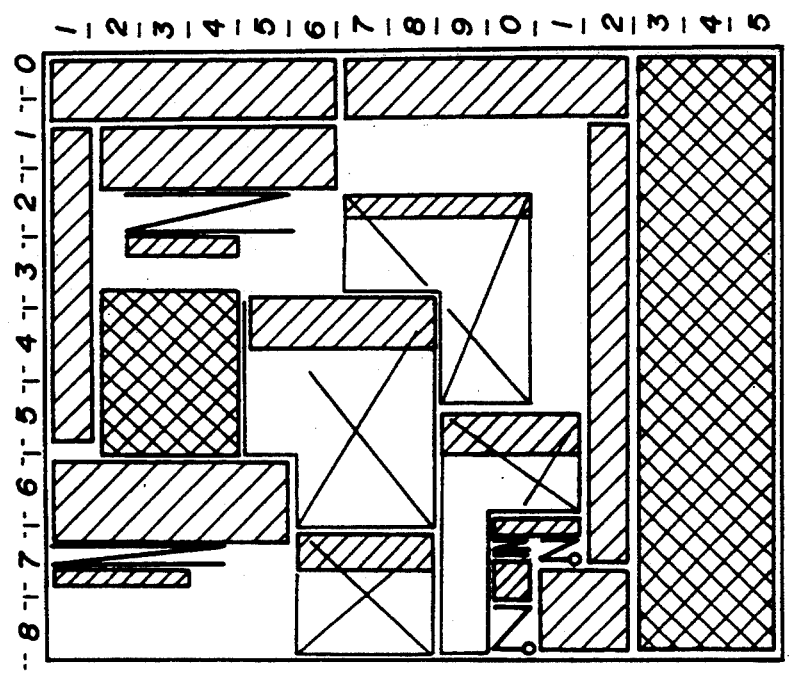

Further, in the step S2-5 of FIG. 7, the materials not yet laid out are laid out in each article, according to a predetermined order so as to obtain a provisional preview layout shown in FIG. 8(G). In this layout process, the materials are laid out according to the general rule that the headings are placed at the upper right corner while the pictures are urged or indented to the left edge of the type area allocated to the article.

Next, the process of FIG. 7 will be described in more detail with reference to FIG. 9, wherein it will be noted that the step S2-1 includes sub-steps (1)–(5), the step S2-2 includes sub-steps (6)–(9), and the step S2-3 includes sub-steps (10)–(11).

Figure 9:
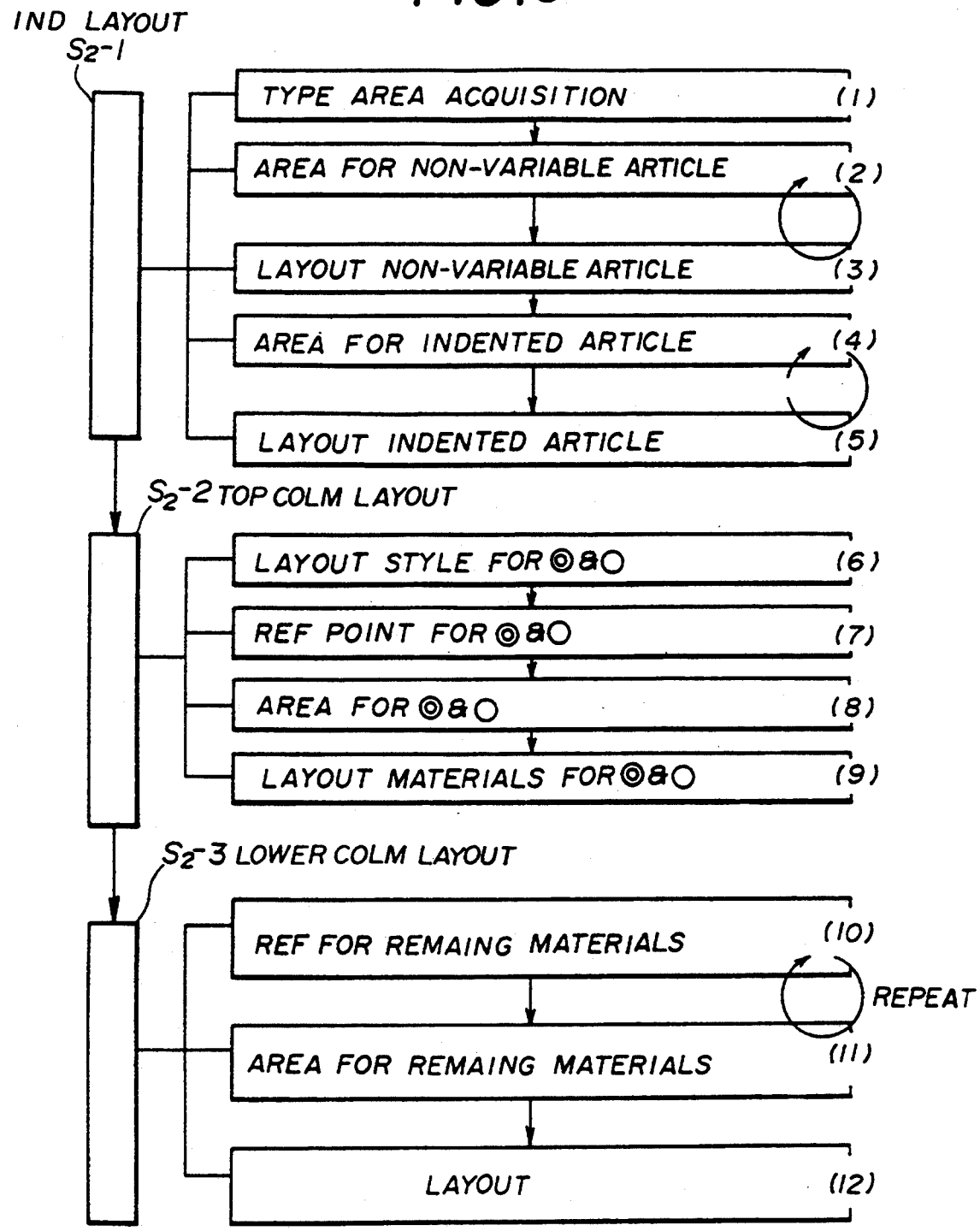
FIG. 9 is a flowchart showing the process of the preview layout in detail.

Referring to FIG. 9, the first sub-step (1) carries out the acquisition of information about the type and structure of the type area, such as the type area identification 0123AA60. Next, the sub-step (2) determines the area for a non-variable article, and the sub-step (3) carries out the layout of the materials for the non-variable article having of which area is determined in the step (2). There, the sub-steps (2) and (3) are repeated until all the non-variable articles are laid out. Further, in a step (4), the area for an indented article is determined, and a step (5) is conducted subsequently for laying out the materials for the indented article on the area determined in the step (4). Further, the steps (4) and (5) are repeated for all the indented articles.

Next, the process of the sub-step (6) will be described step by step. In the step (6), the layout style of the headline article and the sub-headline article are determined according to the steps of:

(6.1) Extract the materials forming the headline article (BNO=1) in a predetermined order. For example, the extracting process proceeds in the following order: <1>highlighting (BNO=1, RNO=1); <2>heading (BNO=1, RNO=2); <3>sub-heading (BNO=1, RNO=3); <4>heading (BNO=1, RNO=4); and <5>boxed column (BNO=1, RNO=5). Hereinafter, the designation BNO=1, RNO=1 . . . will be simply represented as (1 - 1), . . . for the sake of simplicity.

(6.2) Determine the size of the materials based upon the size information SIZE. In the present example, the size of the materials is determined as follows. horizontal highlighting (1-1): 1 column×44 lines; vertical heading (1-2): 5 columns×10 lines; vertical heading (1-4): 3 columns×3 lines.

(6.3) In view of the type of the highlighting and further in view of the type of the materials including the highlighting and the heading, a decision is made about the layout style. In the present example, a horizontal highlighting style, determined primarily by the horizontal highlighting (1-1) is adopted. There, the size of the laterally extending horizontal highlighting is used for defining the lateral size of the area for the headline article. In other words, the physical width of the area for the headline article is set to a size of 44 lines.

(6.4) Next, the materials in the sub-headline article (BNO=5) are extracted in the following the order: <1>heading (5-5); <2>sub-heading (5-2); and <3>heading (5-3).

(6.5) Determine the size of the materials based upon the highlighting, heading, and picture. In the present case, the size is determined as follows: vertical heading (5-1): 5 columns×12 lines vertical heading (5-3): 3 columns×3 lines.

(6.6) Determine the layout style in view of the vertical highlighting as well as in view of the other the materials up to the level of the heading. In the present example, a vertical highlighting style is adopted. There, the lateral size of the area for the sub-headline article is determined as a sum of the width of the heading (5-1), the sub-heading (5-2) and the heading (5-3), plus a width corresponding to two lines (12+3+3+2=20 lines). There, the last two lines serve as the border of the area.

As a result of the foregoing process of the sub-step (6), a provisional decision is made such that the horizontal highlighting style is employed for the article having the BNO of 1, with the lateral width of 44 lines, and such that the vertical highlighting style is employed for the article having the BNO of 5 with the lateral width of 20 lines.

Next, in the sub-step (7), the reference point for the headline article characterized by a BNO of 1 and the reference point for the sub-headline article characterized by a BNO of 5, are determined. The process of the sub-step (7) includes the following steps (7.1)–(7.3):

(7.1) Determine the order of the materials included in the headline and sub-headline articles, and define the reference point for each of the articles in view of the material that is used for defining the lateral size of the article. In the instant example using the horizontal highlighting, the first reference point is determined based upon the headline article (BNO=1).

(7.2) Set the reference point for the headline article having the BNO of 1, at the upper right corner of the unoccupied area.

(7.3) Set the reference point for the sub-headline article having the BNO of 5, at the left of the reference point of the headline article, with a separation equal to the lateral width of the headline article (44 lines) plus 2 lines for the boundary area. Thereby, the reference point of the sub-headline article is located at the 56th line of the first column.

As a result of the foregoing sub-steps (7.1)–(7.3), the reference points for the headline article and the sub-headline article are determined as shown in FIG. 8(B).

In the sub-step (8), the areas for the headline article and the sub-headline article are secured as follows.

(8.1) Secure the area for the materials in the headline article in correspondence to the area starting from the tenth line of the first column and extending laterally with a width of 44 lines and further vertically with a height sufficient to reach the sixth column.

(8.2) Secure the area for the materials in the sub-headline article in correspondence to the area starting from the 56th line of the first column and extending laterally with a width of 27 lines as well as vertically for five columns.

Next, in the sub-step (9), the materials in the article are laid out.

(9.1) Extract those materials forming an unaligned column in each of the headline article and the sub-headline article. Combine the materials thus extracted either (a) vertically so as to form an aligned column; or (b) laterally to occupy a predetermined reference width.

(9.2) Lay out the materials in each area of the headline article and the sub-headline article, according to the predetermined order of the materials continuing up to the material immediately previous to the sub-heading, starting from the upper right corner of the secured area. When the layout is unsuccessful, the attempt is repeated with respect to the next column.

(9.3) Lay out pictures such as photographs, drawings or tables, if any, to the left edge of the given area.

(9.4) Lay out any materials for which space has not yet been determined within the area for the article, with the decreasing order of priority starting from: sub-heading; heading; picture; box; table, and the like. Thereby, the heading is placed at the upper right corner so as to extend vertically to the lower columns, while the picture, box, table, and the like are urged to the lower left corner so as to extend in the upward direction. There, the heading is allowed to extend downward beyond the area of the article, while if the pictures, boxes, tables, and the like have exceeded the upper boundary of the area allocated to the article, the layout is repeated, starting with the upper right corner so as to extend in the downward direction.

(9.5) Decide the layout of each material with respect to: (a) initial column, measured in terms of a number of columns from the reference point of the article; (b) relative position in the direction of lines within in the area (represented in terms of R, L and C; R=right; L=left; C=center); (c) initial character position; and (d) order of layout. Thereby, the headline article and the sub-headline article are laid out as explained with reference to FIG. 8(C).

In the sub-step (10), the reference point for a variable article, other than the headline and sub-headline articles is determined. The process includes steps (10.1)–(10.21) as will be described below.

(10.1) Determine the reference point for the next article. The next article would be the second article of the headline family designated by the BNO of 2, provided that there is no third rank article.

(10.2) Find out possible column(s) from which the reference heading (2-1) for the second article (BNO=2) of the headline family can be started, such that there is no vertically or laterally aligned headings, and no text-only column. In view of the foregoing restrictions, candidate columns are found to be the fourth column, fifth column and the sixth column.

(10.3) Lay out the reference headings for the remaining articles of the headline family in correspondence to each of the candidate columns such that no vertical or lateral alignment of headings occurs and such that there is no text-only column extending throughout the page. In view of the foregoing restrictions, an order of priority is attached to each of the candidate columns found out in the step of (10.2). For example, priority decreases in the following order: fifth column, fourth column, sixth column.

(10.4) Determine the horizontal area for each of the candidate columns, starting with the candidate column having the highest priority. It should be noted that area for the second article (BNO=2) of the headline article family extends from the first line of the headline article to the first line of the sub-headline article. Therein, the possibility of laying out the materials is examined.

(10.5) Determine the position of the first line when it is decided that the layout of materials is possible. Thereby, the first line position is determined, based upon the layout style, while the materials of the headline family such as the horizontal highlighting, horizontal heading, vertical highlighting and the vertical heading are laid out in correspondence to the center of a vacant line. Further, the materials of the box family such as boxed columns and photographs are urged to the left edge of the area.

(10.6) Determine the reference point (first column, first line), and conduct the layout of the reference heading so as to obtain a provisional layout.

(10.7) Determine the reference point for the second article (BNO=6) of the sub-headline family in view of the layout of the five-column heading (5-1) of the sub-headline article (BNO=5), and layout the three-column heading (6-1) of the second article such that there is no vertical or lateral alignment of the headings and such that there is no text column extending laterally through the entire page. Thereby, one finds the third column, fourth column and fifth column to be the candidate column of the heading (6-1).

(10.8) Provide an order of priority to each of the candidate columns found in the step (10.7) such that the text column does not extend too far in the lateral direction. Thereby, the priority is given in the decreasing order as follows: sixth column, fifth column, and fourth column.

(10.9) Determine the horizontal area for each of the candidate columns according to the order of priority of the candidate column. It should be noted that area for the second article (BNO=2) of the headline article family extends from the first line of the sub-headline article to the left edge of the page. Therein, the possibility of laying out the material is examined.

(10.10) When the layout is possible, determine the position of the first line. The first line position is determined based upon the layout style, while the materials of the heading family such as the horizontal highlighting, horizontal heading, vertical highlighting and the vertical heading are laid out in correspondence to the center of a vacant line. Further, the materials of the box family such as boxed columns and photographs are urged to the left edge of the area.

(10.11) Determine the reference point (first column, first line), and conduct the layout of the reference headings so as to obtain a provisional layout.

(10.12) Determine the reference point for the third article (BNO=3) of the headline article family in view of the layout of the five-column heading (2-1) of the second article (BNO=2) of the headline family, and layout the four-column heading (3-1) of the third article such that there is no vertical or lateral alignment of the headings and such that there is no text column extending laterally for the entire page. Thereby, one finds the sixth column, seventh column and eighth column to be the candidate columns of the heading (3-1).

(10.13) Provide an order of priority to each of the candidate columns found in the step (10.12) such that the text column does not extend too far in the lateral direction. Thereby, the priority is given in the decreasing order, as follows: seventh column, sixth column, and eighth column.

(10.14) Determine the horizontal area for each of the candidate columns, starting with the candidate column having the highest priority. It should be noted that area for the headline family at the seventh column starts with the right edge and extends to the first line of the second article (BNO=6). When there are a plurality of candidate columns, an examination is made as to whether or not the layout is possible, starting from the candidate column having the largest area. This examination concerns the materials continuing down to the reference heading.

(10.15) When it is decided that the layout is possible, the initial line is determined. Because of the current layout style that is based upon the headings, the initial line is set at the center of a vacant line.

(10.16) After the reference point (initial column, initial line) is thus determined, the reference heading is laid out and the area is deleted.

(10.17) Find out the reference point for the fourth article (BNO=4) of the headline family, based upon the layout of the fourth-column heading (3-1) of the third article (BNO=3) that belongs to the headline family, such that the three-column heading (4-1) of the fourth article (BNO=4) of the headline family is laid out without causing vertical or horizontal alignment of the headlines or a text-only column to extend laterally for the entire page.

In the present example, the ninth and tenth column are the candidate columns.

(10.18) Provide an order of priority to the candidate columns thus found, according to a rule such that there is no column wherein the remaining article (there is no remaining article in the illustrated example) as well as the text thereof extend laterally throughout the page and such that the text does not extend too far in the lateral direction. Thereby, the ninth line has the highest priority followed by the tenth line.

(10.19) Determine the horizontal area for each of the candidate columns, starting with the candidate column having the highest priority. It should be noted that area for the headline family at the ninth column can be formed at any side of the heading (3-1). When there is a plurality of candidate areas, the candidate having the larger area is examined first with respect to the possibility of laying out the materials continuing up to the reference heading.

(10.20) When it is decided that the layout is possible, the first line is determined. As the current layout style is based upon the headings and highlightings, the first line is set at the center of the unoccupied line.

(10.21) The reference point is determined with respect to the first column, first line, the materials up to the reference heading are laid out provisionally.

According to the process described above, one can obtain the reference point for the articles having the third rank or lower in each theme family as indicated in FIGS. 8(E) and 8(F).

Next, in the sub-step (11), the area for the article or article family having the lower rank is determined. Hereinafter, each step of the sub-step (11) will be described.

(11.1) Secure the area for each article, based upon the layout style and the result of provisional layout of the materials.

(11.2) Secure the area corresponding to four columns from the reference point for the second article (BNO=2) of the headline family, in view of the vertical highlighting style. For the third article (BNO=3) of the headline family, an area spanning for four columns is secured starting from the reference point, in view of the vertical highlighting style. For the fourth article (BNO=4) of the headline family, an area corresponding to three columns is secured from the reference point, in view of the vertical highlighting style. Further, with respect to the second article (BNO=6) of the sub-headline family, an area corresponding to three columns is secured from the reference point in view of the vertical highlighting style. Thereby, the areas for the respective articles are secured as shown in FIG. 8(G).

Next, the sub-step (12) for laying out the materials for the articles of lower rank will be described.

(12.1) Determine the layout of the materials for the lower rank articles according to the order used when determining the reference point. Thereby, those materials forming an unaligned column are extracted and combined with each other either vertically so as to form an aligned column or laterally so as to form a column having a predetermined width corresponding to the width of the unaligned column that appeared first.

(12.2) Lay out the materials within the area for each article according to the order of processing of the materials continuing up to the material immediately before the sub-heading. Thereby, the layout is started with the upper right corner. When it turns out that the layout is unsuccessful, the layout is again attempted with respect to the next column.

(12.3) Lay out a boxed column such as photograph, box or table, if any, in the allocated area, starting from the upper left corner.

(12.4) Lay out the remaining materials, in each area of the respective articles, starting with the sub-heading, heading, photograph, box, and table, according to the predetermined processing order. Thereby, the sub-heading and the heading are laid out so as to extend in the downward direction from the upper right corner, while the photographs, boxes, and tables are laid out so as to extend in the downward direction starting from the upper left corner. Thereby, the boundary of the area may be exceeded when laying out the heading and sub-heading. Alternatively, the layout of the columned materials may be attempted, starting from the upper right corner, when the above layout process is unsuccessful.

TABLE I-continued

| REF COLM | REF LINE | MATR POS | DIR | CHAR POS | ORDER |
|---|---|---|---|---|---|
| 1-1 | | 1 | R | 0 | 1 |
| 1-2 | | 2 | R | 0 | 2 |
| 1-3 | | 2 | R | 0 | 3 |
| 1-4 | | 2 | R | 0 | 4 |
| 1-5 | | 2 | L | 0 | 5 | wherein R represents the right indentation while L represents the left indentation. Further, the reference column designated as REF COL and the reference line designated as REF LINE represents the reference point explained previously. Similarly, the information about the articles of the headline family and the sub-headline family are obtained. The description for these articles will be omitted. In the process of this stage, the setting of the reference column and reference line is particularly important.

The layout information, designated in FIG. 10 as LAYOUT INFO, represents the result of the provisional page layout to be described later. In the illustrated example, the result of the layout for the headline article (BNO=1) and the sub-headline article (BNO=5) is given as:

TABLE II

| REF COLM | REF LINE | NO COLM | FOLDED COLM | DIR R/L | ± | TEXT STREAM | PROC ORDER |
|---|---|---|---|---|---|---|---|
| 1-0 | 110 | 4 | 7 | R | 0 | 2 | 12 |
| 5-0 | 154 | 6 | 1 | L | 0 | 1 | 8 |

(12.5) Determine the layout of each material. Thereby, the position of the starting column is determined with respect to the reference point of the article; the lateral position in the area is determined in terms of the representation R (right), L (left) and C (center); and the order of the layout is determined.

(12.6) Adjust the area for each of the articles. Further, the result of layout is evaluated with respect to the overlapping of materials and style of text column.

(12.7) When there is a problem in the layout of the materials, the reference point is changed with respect to the article and the materials are relocated.

As a result of the foregoing process of (12.1)–(12.7), the materials for the remaining articles are laid out as represented in FIG. 8(H), wherein it will be noted that the headline family articles and the sub-headline family articles are disposed in the lateral direction.

FIG. 10 shows an example of the result of the preview layout thus obtained. It should be noted that the table of FIG. 10 is similar to the table of FIG. 6 and the only the essential part thereof will be described.

Referring to FIG. 10, it will be noted that the information designated as PREVIEW INFO represents the result of the preview layout corresponding to FIG. 8(H) and is achieved according to the process of the sub-steps (6) through (12) described above. For example, the representation of the PREVIEW INFO with respect to the headline article (BNO=1) can be represented as:

TABLE I

| REF COLM | REF LINE | MATR POS | DIR | CHAR POS | ORDER |
|---|---|---|---|---|---|
| 1-0 | 1 | 10 | | | |

Figure 11:
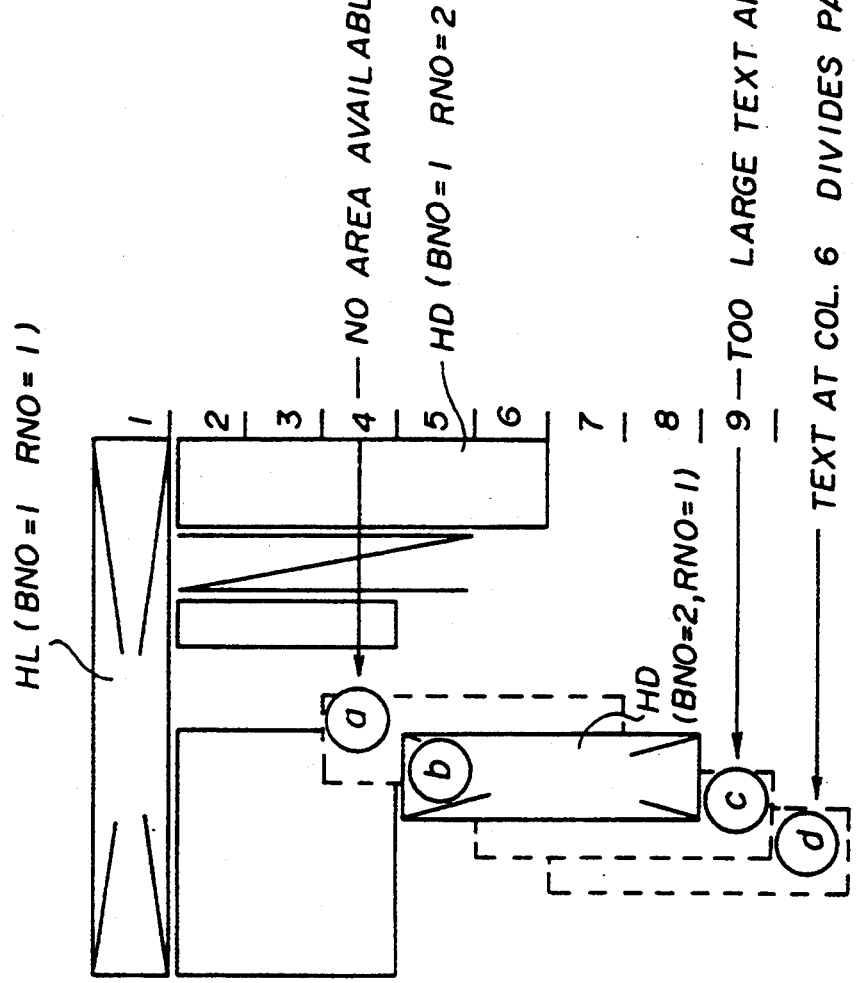
FIG. 11 is a diagram showing the process of determining a reference point in the preview layout process.

FIG. 11 shows the process for determining the reference position for the initial column. The process of FIG. 11 corresponds to the process of FIG. 8(D). It will be noted that there are four candidate reference positions: (a) one at the column 4, (b) one at the column 5, (c) one at the column 6 and (d) one at the column 7. Thereby, an order of priority is attached to the candidates (a)–(d) according to the constraint that varies in each candidate. For example, the candidate (a) cannot provide a necessary area for the layout of the materials for the second article that has the BNO of 2. On the other hand, the candidate (c) provides an area too large for the text. Further, the candidate (d) results in a text column extending fully in the lateral direction at the column 6 so as to divide the page into upper part and lower part. Such a layout is prohibited in the Japanese newspapers. Accordingly, the candidates are given priority according to the order of (b) at the 5th column; (a) at the 4th column; (c) at the 6th column; and (d) at the 7th column. Next, the possible position of the first line is searched for according to the process of the steps (10.4) and (10.5) so as to determine the reference point.

Figure 12:
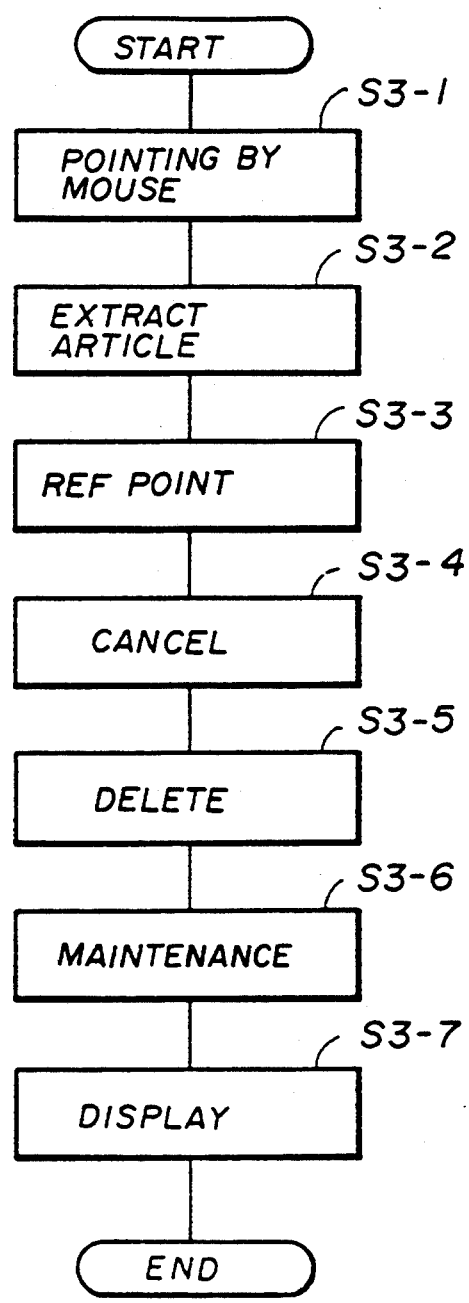
FIG. 12 is a flowchart showing the process of modifying the preview layout.

FIG. 12 shows a flowchart of the process for modifying the preview layout according to the present invention. Thereby, the process of FIG. 15 modifies the layout according to the operator's intention so as to create the page layout of FIG. 8(H).

Referring to FIG. 12, the process starts with a step S3-1 wherein, in the screen showing the picture of FIG. 8(H), an article that is to be moved is pointed at by means of a mouse. Further, the location to which the article is to be moved is pointed simultaneously in the step S3-1. Next, a step S3-2 is conducted for specifying the article in the table of materials shown in FIG. 6 by pointing the block number BNO by means of the mouse. Further, in a step S3-3, the reference point of the area to which the article is to be moved is pointed by means of the mouse.

In a step S3-4, the original area is canceled and the representation of the original area is deleted in a step S3-5. Further, in a step S3-6, the available area is updated. This process is achieved by rewriting the reference point of the selected article in terms of the column and line of the location to which the article is to be moved. Further, the movement of the article is achieved. Finally, the display of the article is achieved in a step S3-7.

According to the foregoing processes, the articles to be moved are pointed to by means of the mouse and the reference point is updated for each article. Further, the articles are re-represented, based upon the result of the pointing. Thereby, the system conducts an automatic movement of the articles to a specific position based upon the instruction by the operator. The results that can be effected by means of the foregoing process are as follows.

(1) Simultaneous movement of the materials in each of the articles.
(2) Movement of the individual materials.
(3) Exchange of the materials between articles.
(4) Arbitrary instruction of layout and removal of such an instruction.
(5) Display of size of the individual materials and modifications thereof.
(6) Display of the number of unoccupied lines.

Figure 13:
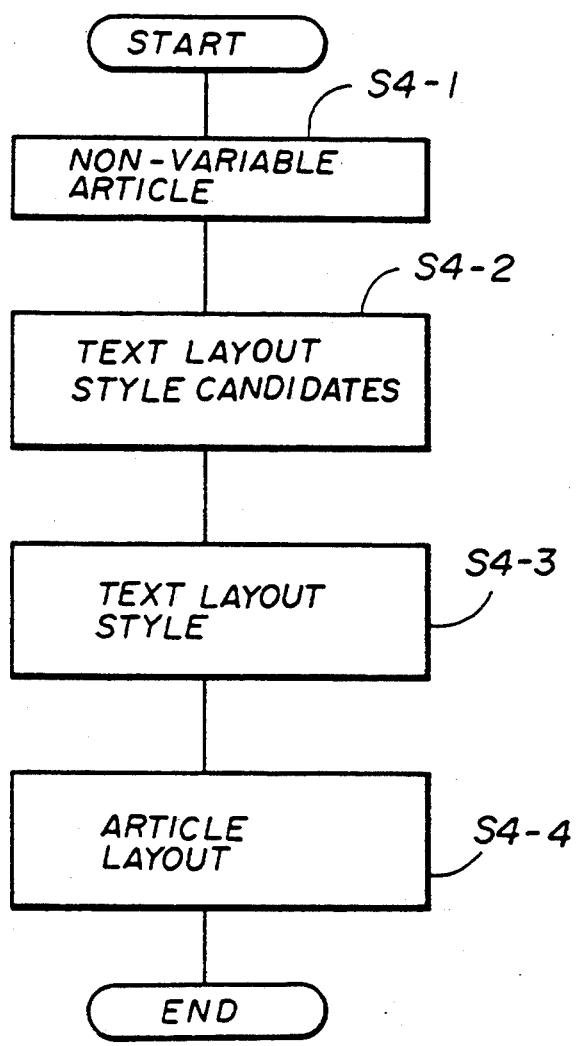
FIG. 13 is a flowchart showing the process of determining a layout.

FIG. 13 shows the flowchart of a provisional page layout process according to the present invention. The process of FIG. 13 determines the layout of the materials including the area of text on the type area based upon the rough reference position for each of the articles and further with reference to the size of the materials. The process of FIG. 13 corresponds to the conventional "detailed sketch" conducted manually by an expert. Generally, the process of FIG. 13 conducts the layout, starting from the side edge of the type area, and determines the provisional layout for the remaining areas by combining various layouts until a self-consistent overall page layout is achieved. The process of the provisional layout process will now be described.

Referring to FIG. 13, the process starts with a step S4-1 for determining the area for the non-variable articles. Thereby, the layout for the non-variable articles such as BNO80–BNO83 as well as for the indented articles such as BNO7 and BNO8 is achieved. This process corresponds to a step S4-11 of FIG. 15 to be described.

Next, in a step S4-2, candidates for overall text layout are determined based upon the given preview layout. The phrase "text layout style" will be described later with reference to FIGS. 14(A)–14(D). The process of the step S4-2 corresponds to a step S4-18 to be described. Further, in a step S4-3, the area for the materials is determined by examining whether or not the materials can be laid out on the given area, so as to find out a possible text layout style wherein the layout of materials including text is possible on the given area. The process of the step S4-3 corresponds to the process of steps S4-19 and S4-20 of FIG. 15.

In a step S4-4, the position of the materials and the area of the text are determined. Thereby, the process of the step S4-4 corresponds to the steps S4-21 and S4-22 of FIG. 15. As a result of the above, a provisional layout is determined based upon the result of the preview layout.

Figure 14A:
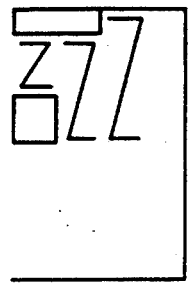
FIGS. 14(A)-14(D) are diagrams showing various examples of text layout style wherein the text is folded into number of columns.
Figure 14B:
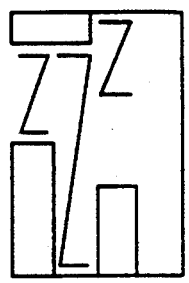
Figure 14C:
Figure 14D:
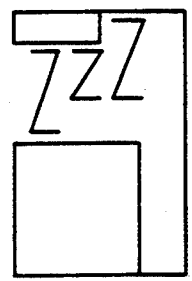

In the process of the provisional layout described above, one can choose a text layout style from several layout styles. For example, FIG. 14(A) shows an example of the left-indented text layout style wherein the materials forming an article including the text are indented to the left edge of the area allocated to the article, while FIG. 14(B) shows an example of the right-indented text layout. Further, FIG. 14(C) shows an example of the text folding, wherein the unindented text layout style and the indented text layout style are mixed. FIG. 14(D) shows, on the other hand, an example of the text layout style wherein the materials are laid out without specific indentation.

Figure 15:
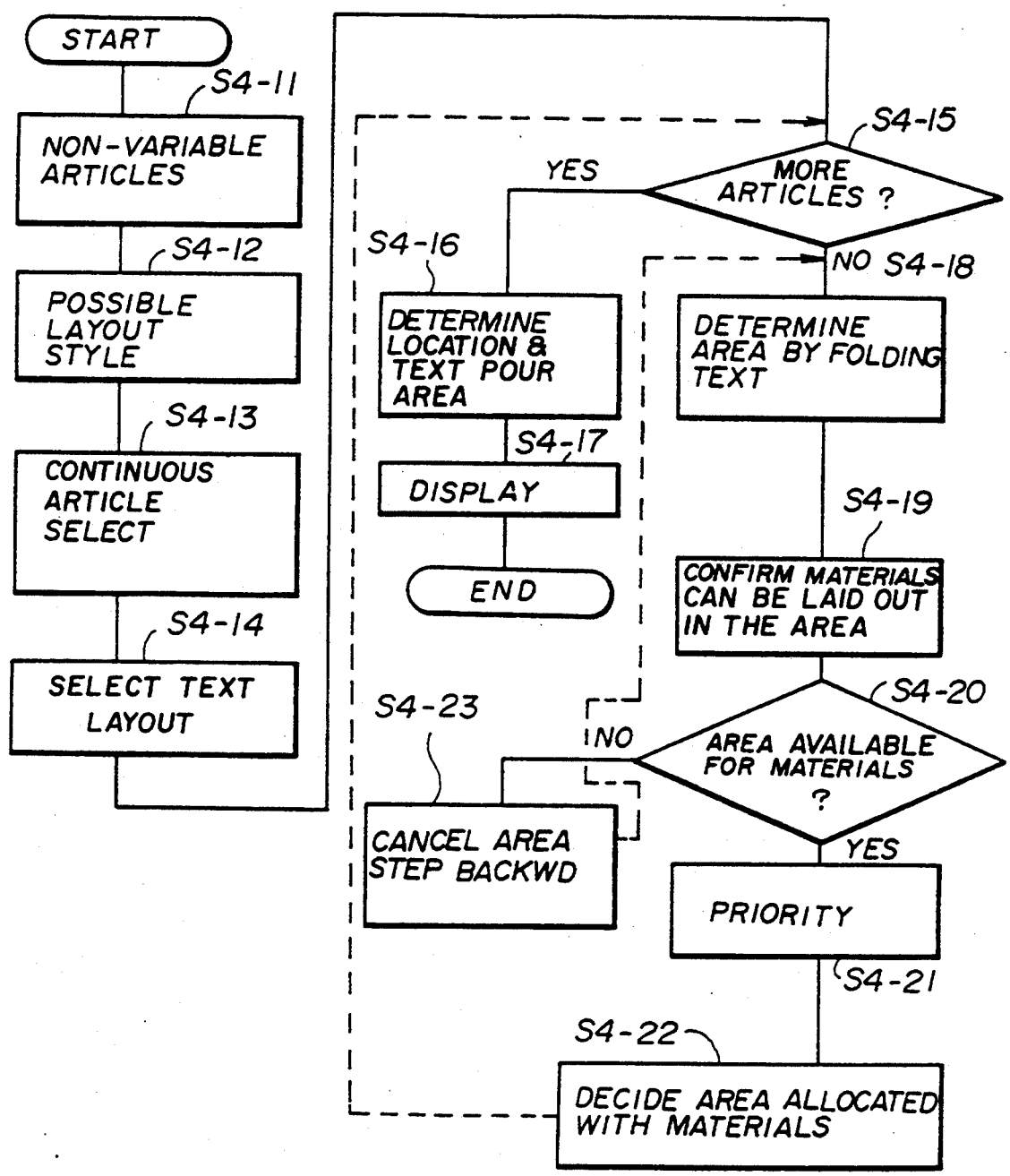
FIG. 15 is a flowchart showing the process of a page layout.

Next, the process of the page layout will be described in more detail with reference to FIG. 15 showing an example of laying out the materials listed in the table of FIG. 6.

Referring to FIG. 15, the process starts with a step S4-11 for laying out the area for the non-variable articles and indented articles such as the articles having the block number (BNO) of 80–83 and 7 and 8.

Figure 16B:
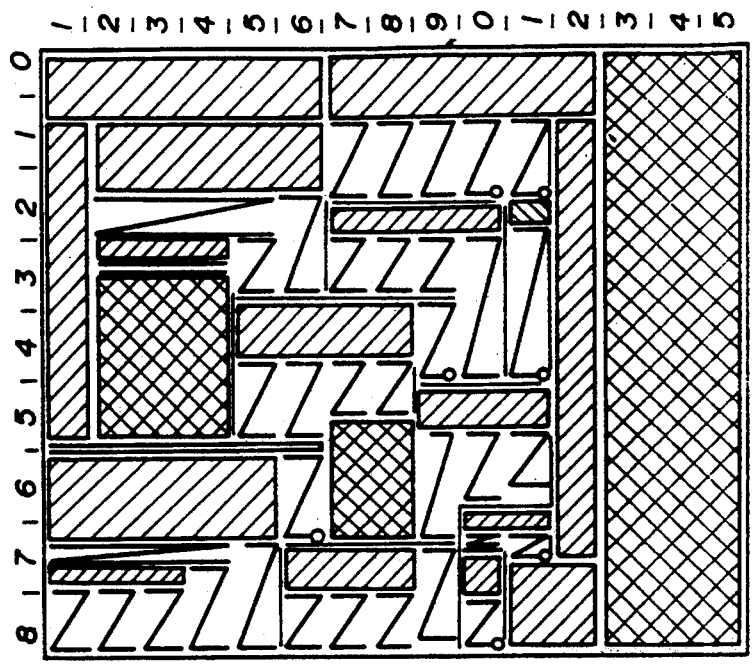
FIGS. 16(A) and 16(B) are diagrams showing an example of the page layout.
Figure 16A:
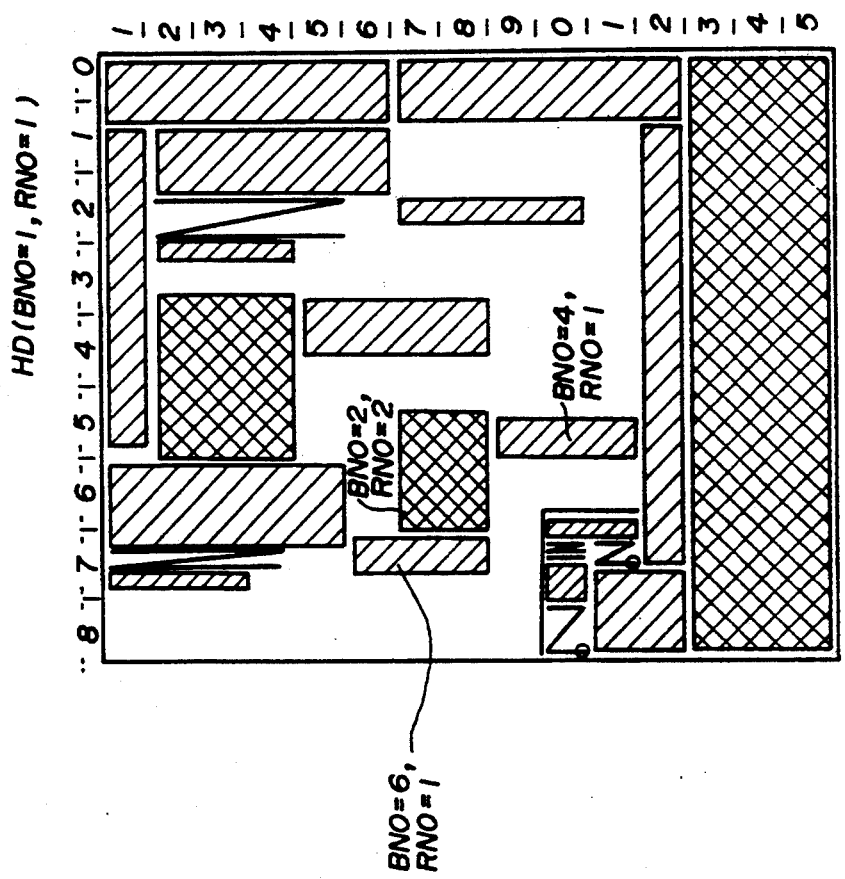

Next, in a step S4-12, the possible or allowable text layout style is searched for each article. In the example of the sub-headline article having the BNO of 5, for example, it will be noted that the area at the right is occupied by the adjacent article (BNO=1) as indicated by the horizontal highlighting (BNO=1, RNO=1). See FIG. 16(A) showing the type area before the layout. Thereby, the area for two lines at the 54th and 55th lines is used to form a vertically extending boundary as indicated in FIG. 16(B), wherein the drawing shows the type area after the layout process has been conducted. It should be noted that the layout of FIG. 16(A) is identical to the preview layout of FIG. 8(H).

Further, it is checked if there is a limitation in applying the text to form the text columns. In the example of the second article (BNO=2) of the double-circled headline family, it will be noted in FIG. 16(A) that the two-column-height photograph at the seventh column (BNO=2, RNO=2) may block the text. Thereby, the number of the folded text columns may be five, six, eight and nine.

The text layout style for other articles are determined as follows.

Second article of the semi-headline family (BNO=6): Minimum number of columns=3. As the article has a simple vertical heading with a height of three columns, the text is simply indented to the right. There is no limitation in the number of foldings. Thus, the text may be folded into three to six columns.

Sub-headline article (BNO=5): Described already.

Fourth article of the headline family (BNO=4): Minimum number of columns=3. The article has a simple vertical heading having a height of three columns. Thus, the material is simply indented to the right. The number of folded columns is set to three in view of the twelfth column being occupied already by the non-variable article (BNO=83).

Second article of headline family (BNO=2): Minimum number of columns=4. It is examined whether it is possible to fold the text in combination and in conformity with other articles. The examination is effected: (a) in the vertical direction, starting from the reference column (fifth column) plus one column to the reference column plus minimum number of columns plus one column (=from sixth through tenth columns); and (b)

in the lateral direction, starting from the 34 lines to 67 lines. In the present example, the foregoing area overlaps with the area for the fourth article of the headline family (BNO=4) and thus, there is a possibility of combining the folding of text with this article. On the other hand, because of the rule that there must be text below the heading of an article that is combined with another article, the fourth article of the headline family cannot be used for such a purpose. For the foregoing reason, a simple indentation is adopted for the folding layout style of the text. There is no limitation as to the number of the folded text columns. In other words, the number of columns may either be four, five, six or seven.

Third article of headline family (BNO=3): Minimum number of columns=4. Because the article includes only a heading except for text, the text layout style of indentation is employed. There is no limitation in the number of columns. Thus, the number of columns may be four or five.

First article of first family (BNO=1): the process of S4-13 is not conducted, as the article is located above/-right of a vacant area.

Next, in a step S4-13, an article wherein the text can continue from one side to the other side as in the case of FIG. 14(D) is searched for. More specifically, an article that is located on the upper right corner of an unoccupied area is searched. There, one finds the headline article (BNO=1). Next, an article located below the foregoing headline article and located closest to the right edge is searched. Thereby, one finds the third article of the headline family (BNO=3). Next, an article located further below the foregoing third article (BNO=3) and located closest to the right edge is searched. There, one finds out the fourth article of the headline family (BNO=4). In the present example, it will be noted that the second article of the headline family (BNO=2) blocks the region between the first column of the third article (BNO=3) located at the seventh column of the type area and the first column of the fourth article (BNO=4) located at the eighth columns. Thus, it is decided that the fourth article cannot be used for the continuous text. Thereby, the headline article and the third article of the headline family are picked as the candidate.

Next, in a step of S4-14, the text layout style is determined as shown in FIG. 17. It will be noted that FIG. 17 shows a first layout style 1 and a second layout style 2.

Further, in a step of S4-15, it is decided whether all of the articles have been processed or not, for each of the first set 1 and the second set 2. If the result of the step of S4-15 is YES, the process proceeds to a step S4-16 wherein the provisional page layout is determined. Further, in a step S4-17, the result of the page layout thus achieved is displayed on the screen as shown in FIG. 16(B).

When the result of the discrimination in the step S4-15 is NO, a process of a step S4-18 is conducted wherein the area for the materials is determined based upon the various candidates of folding the text. Further, in a step S4-19, an evaluation is made as to whether or not the materials can be laid out within the area determined in the previous step.

Next, in a step S4-20, an evaluation is made as to whether or not there is an area available for laying out the materials. If the result is YES, a priority is given to the available areas in a step S4-21 for folding the text. Further, in the following step S4-22, the areas wherein the materials are already allocated are decided. Further, the process returns to the step S4-15 for the next article. On the other hand, when it is decided in the step S4-20 that there is no area available, the area is canceled and the processing returns to the step S4-18 wherein an attempt is made with respect to the next candidate.

Next, a process for moving the materials individually will be described with reference to the flowchart of FIG. 18.

Figure 18:
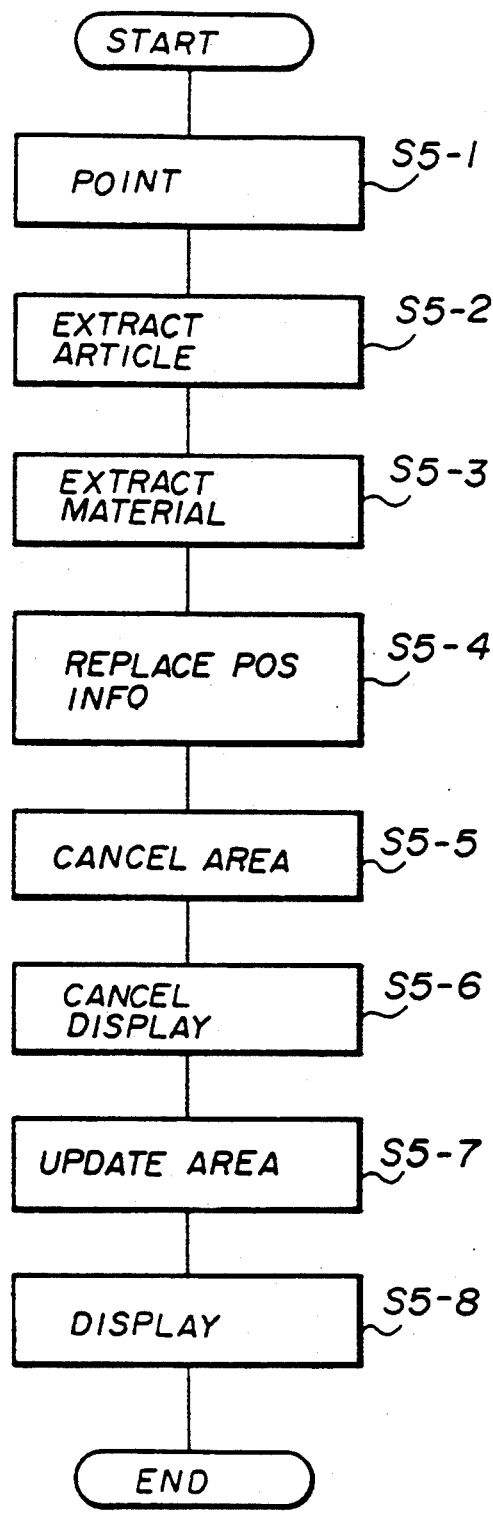
FIG. 18 is a flowcharts showing the process for moving individual materials.

Referring to FIG. 18, the process starts with a step S5-1 wherein the material to be moved as well as the location to which the material is to be moved are pointed to by means of the mouse. Next, in a step S5-2, an article is selected. Thereby, the block number (BNO) of the article that contains the material to be moved is identified. Further, in a step S5-3, the material thus pointed to is extracted by identifying the respective record number (RNO).

In a step S5-4, a modification of the positional information is made with respect to the material that is to be moved. More specifically, the information such as the relative reference position and the order for the original material to be moved is replaced with the corresponding information of the destination material that is to be replaced with the foregoing original material. Thereby, the content of the file 12 is updated in correspondence to the movement of the materials. Next, in a step S5-5, the representation of the original area is canceled and the display thereof is deleted in a step S5-6. Further, the area is updated in a step S5-7, and the display is resumed in a step S5-8 with the updated content.

From the foregoing process of FIG. 18, one can modify the layout as desired while observing the rules that are used by the experts in the art of layout. It will be noted that the processes of FIG. 18 include the following items.

Movement of individual materials.

Display and modification of individual materials.

Change of number of foldings and of the number of folded columns.

Removal, addition and modification of ruler lines.

In addition, the step S5-8 of FIG. 18 includes the display of information such as number of unused lines, materials that are subjected to adjustment, and overflow/underflow of the result of layout.

Figure 19:
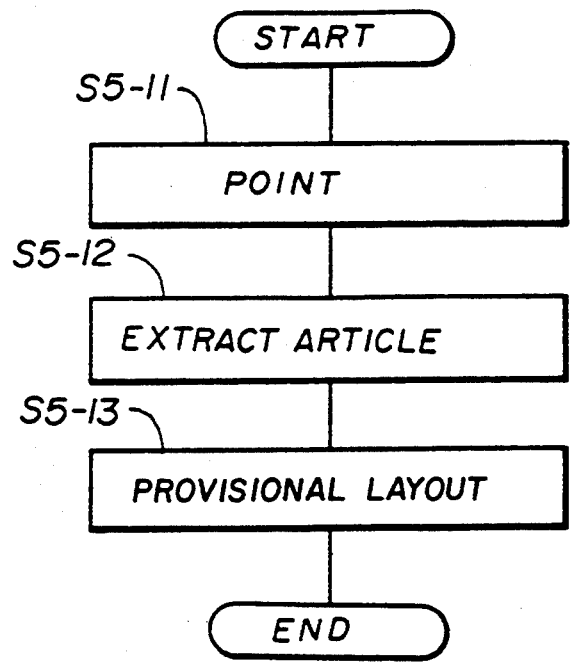
FIGS. 19(A)-19(C) are diagrams showing the process for adjusting a layout in view of the text layout style.
Figure 19:
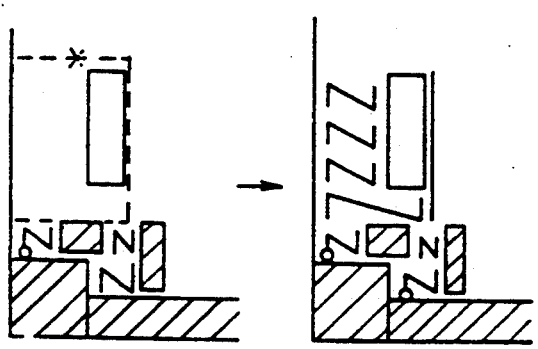

FIG. 19(A) shows the process of arbitrarily conducted layout and cancellation.

Referring to FIG. 19(A), the process starts with a step S5-11 wherein the article that is to be modified is pointed to by a mouse as shown in FIG. 19(B). There, the article as well as the number of folded text columns is specified. Next, in a step S5-12, the article is identified by specifying the BNO of the article that has been selected in the previous step. Further, the layout is determined in a step S5-13, based upon the number of folded text columns and the length of the text to be accommodated in the text columns. Thereby, one obtains the layout as shown in FIG. 19(C).

Figure 20:
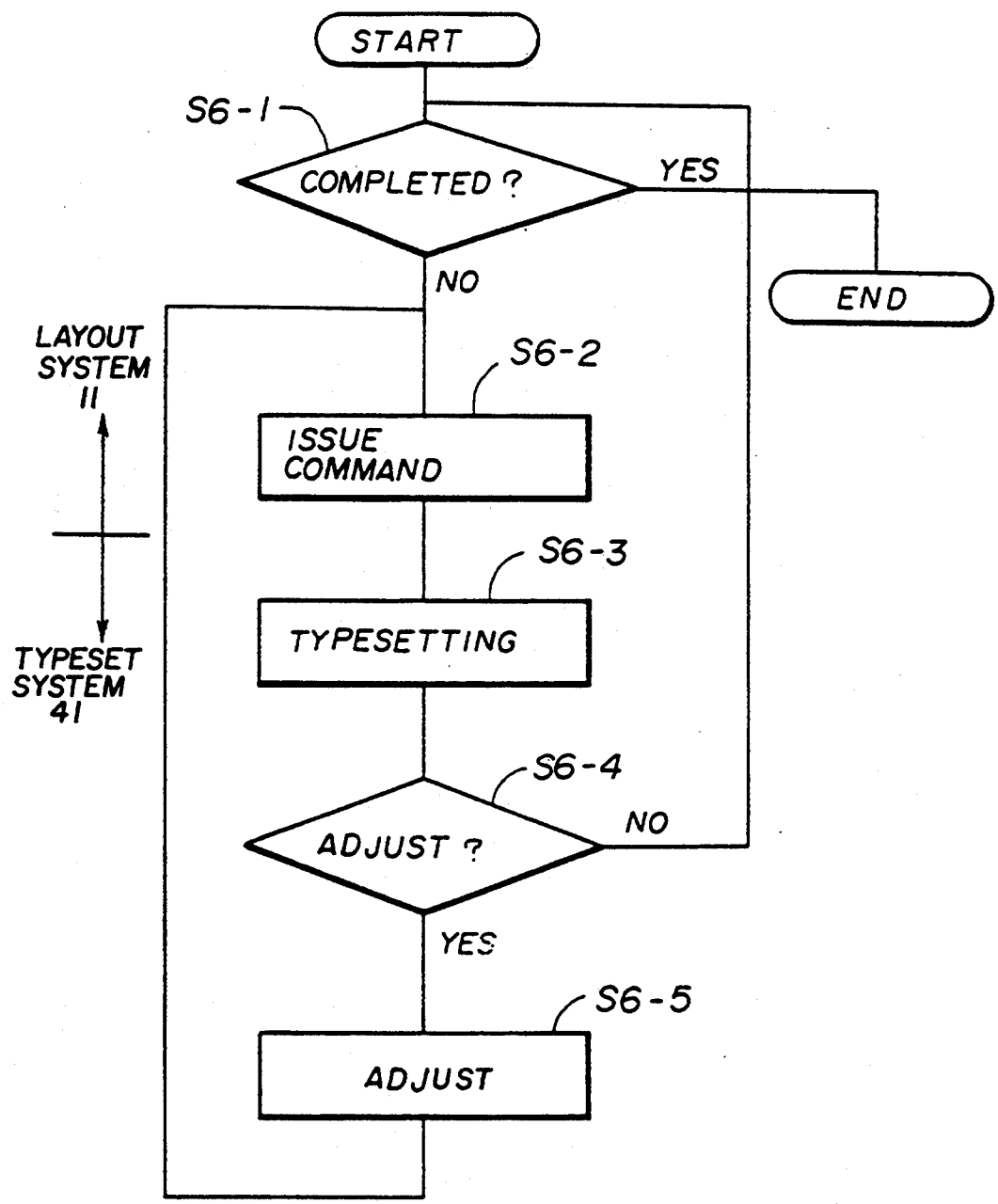
FIG. 20 is a flowchart showing the process of typesetting employed in the system of FIG. 3.

Next, the operation of the typesetting system 41 will be described with reference to FIG. 20 showing the overall operation of the system 41.

Referring to FIG. 20, a discrimination process is conducted in a step S6-1 as to whether or not the typesetting has been completed for all of the articles. When the result is YES, the process is finished. If the result is NO, a process of a step S6-2 is conducted for issuing commands, based upon the given layout, wherein the step S6-2 is conducted for each of the articles.

Based upon the commands issued in the step S6-2, a typesetting process is carried out in a step S6-3 as will be described in more detail with reference to FIG. 21, and a discrimination is made in a step S6-4 as to whether or not an adjustment is necessary. If the result is NO, the process returns to the step S6-1 for the next article. On the other hand, if the result of the step S6-4 is YES, an adjustment is carried out in a step S6-5 and the process returns to the step S6-2.

Next, the process of the step S6-2 will be described in more detail with reference to FIG. 21.

Figure 21:
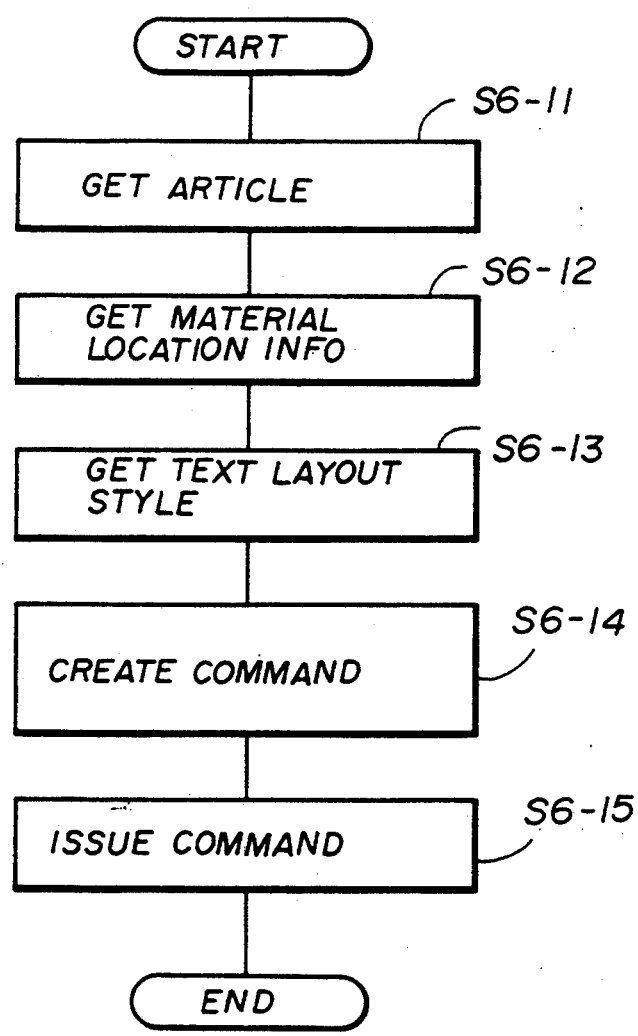
FIG. 21 is a flowchart showing the process for issuing commands for activating the typesetting process.

Referring to FIG. 21, the process starts with a step S6-11 for getting the article that is to be processed. Next, in a step S6-12, the information indicative of the location of the materials is obtained from the given layout, and the text layout style is obtained in a step S6-13. Further, in a step S6-14, a typesetting command is created based upon the information obtained in the previous steps, and the command is issued in a step S6-15. Thereby, the layout determined by the layout system 11 is automatically converted to a set of commands that activates the typesetting system 41. In the block diagram of FIG. 3, the process of FIG. 21 has been conducted in the layout system 11. Thus, one may include the process of FIG. 21 in the layout system 11.

Next, the typesetting process will be described with reference to a flowchart of FIG. 22(A).

Figure 22A:
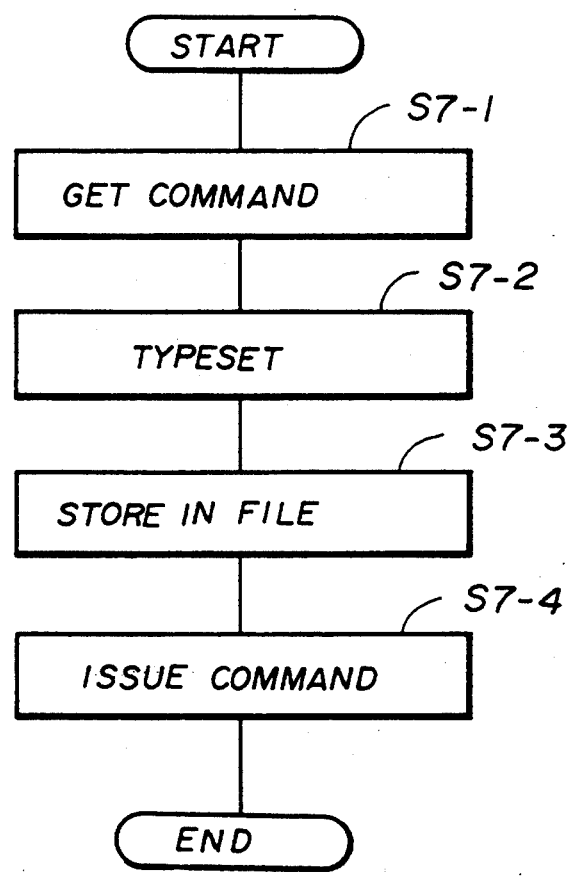
FIGS. 22(A) and 22(B) are flowcharts showing the process of typesetting including adjustment.

Referring to FIG. 22(A), the process starts with a step S7-1 for getting the commands that have been issued in the step S6-2 of FIG. 20. Next, the typesetting is carried out in a subsequent step S7-2. Further, the result of the typesetting is stored in the file 43 of the typesetting system 41 in a step S7-3. Further, in a step S7-4, commands indicative of the result of typesetting are issued. The commands indicate the information about the position in the type area of each material in an article, the number of lines that have caused overflow or underflow, and the like. In the step S7-2 for the typesetting, the materials are allocated to the respectively designated positions in each article, and a check is conducted for overflow or underflow. When there is an overflow or underflow detected, the boundary of the area is modified such that the materials are accommodated in the area of the article.

Figure 22B:
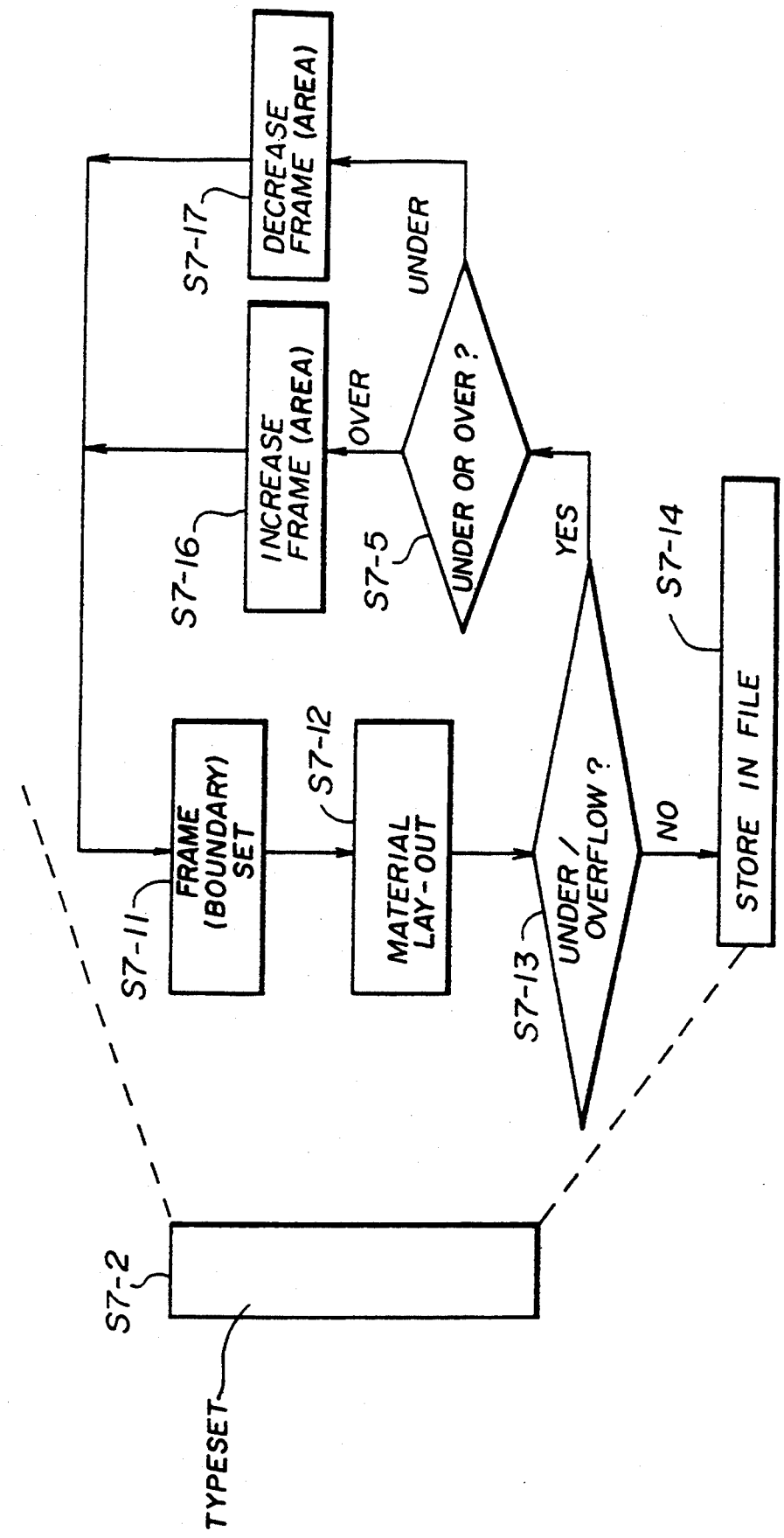

FIG. 22(B) shows the process of typesetting of the step S7-2 in more detail. Referring to FIG. 22(B), the type setting process includes a step of setting a boundary to the area of the article in correspondence to a step S7-11, and the materials are laid out to the respective positions in a step S7-12. Further, in a step S7-13, it is discriminated whether or not there is an overflow or underflow of materials, and if the result is NO, the result of typesetting is stored in the file 43 in a step S7-14. On the other hand, if the result of the discrimination in the step S7-13 is YES, a further discrimination is made in the step S7-15 as to which one of the overflow and underflow has occurred. When there is an overflow, the width of the area is increased by one line in a step S7-16 and the process returns to the step S7-11. On the other hand, when there is an underflow, the width of the area is decreased by one line in a step S7-17 and the process returns to the step S7-11. Thereby, the typesetting is tried again, based upon the modified area for the article.

Figure 23:
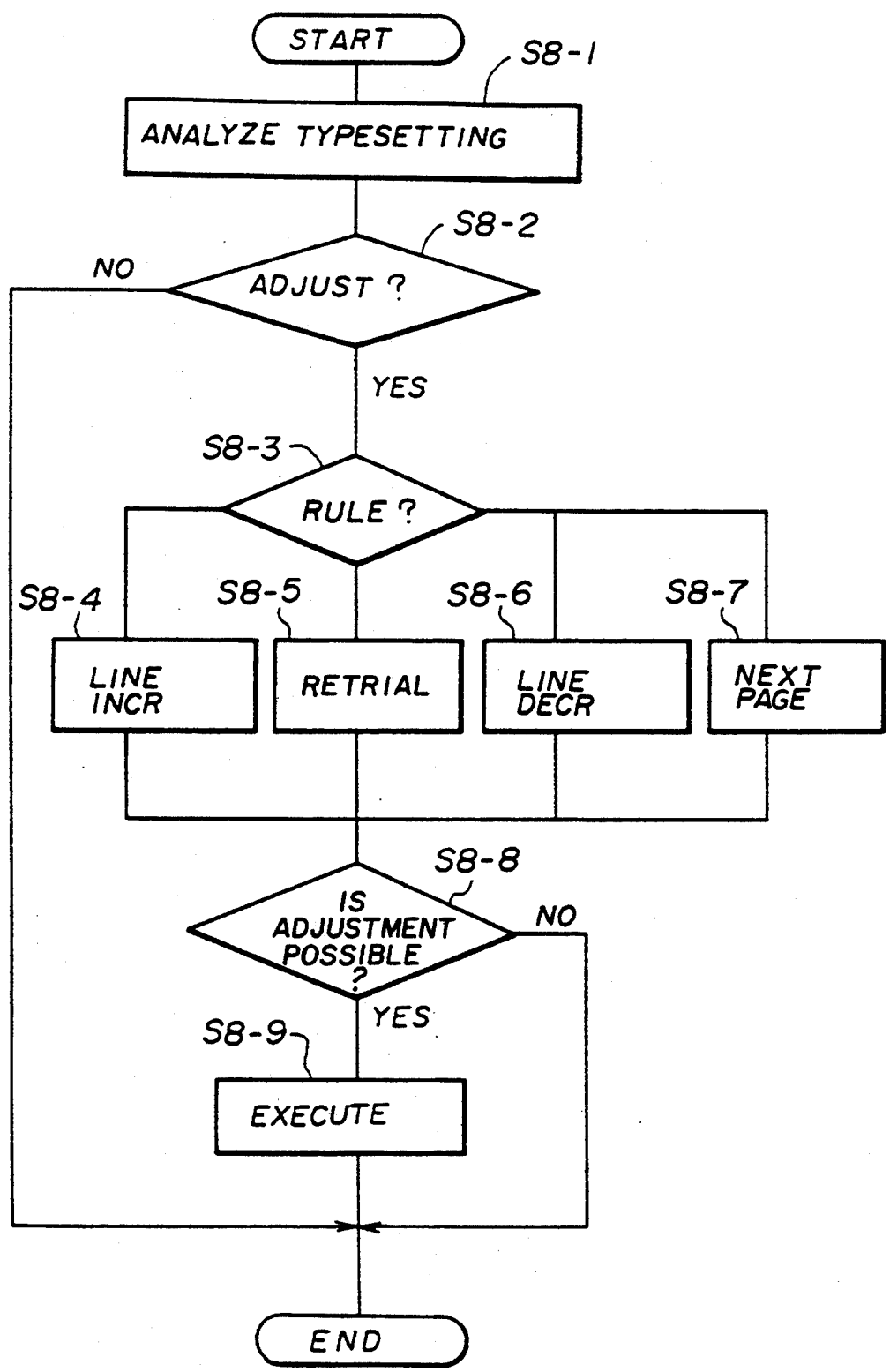
FIG. 23 is a flowchart showing the process of adjustment in the typesetting in detail.

FIG. 23 shows the process for analyzing and adjusting the result of typesetting. The process of FIG. 23 is activated when an underflow or overflow is detected or when the result of the typesetting is different from the given layout.

Referring to FIG. 23, the process starts with a step S8-1 for analyzing the result of the typesetting. Next, in a step S8-2, a judgment is made as to whether an adjustment is appropriate or not. If the result is NO, the process is terminated, while if the result is YES, a step S8-3 is conducted for deciding the rule that is to be applied. Thereby, a particular adjustment rule is selected such as increase or decrease of lines, retrial of typesetting, relocation of the article to the next page, and the like.

When it is decided to use a rule to increase the number of lines in the step S8-3, a step S8-4 is conducted for evaluating the feasibility of the adjustment as will be described later with reference to FIG. 24. Similarly, when it is decided to use the rule of retrial, a step S8-5 is carried out. On the other hand, when it is decided to use a rule to decrease the number of lines, a step S8-6 is carried out. Further, when it is decided to use a rule to relocate the article to the next page, a step S8-7 is carried out.

After any of the foregoing steps S8-4–S8-7, a step S8-8 is carried out for discriminating whether the adjustment is possible or not, and if YES, a step S8-9 is conducted for the actual adjustment.

Figure 24:
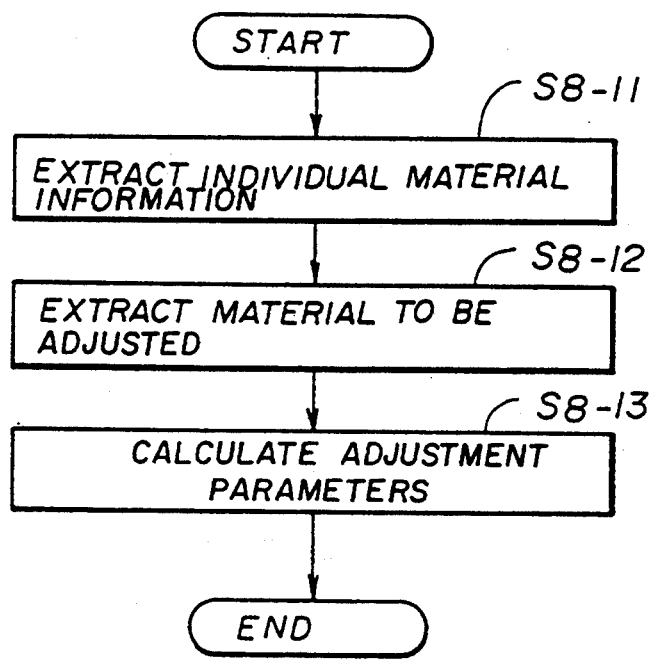
FIG. 24 is a flowchart showing the process of adjusting a width of area for articles in the typesetting process.

FIG. 24 shows the flowchart corresponding to any of the steps S8-4 and S8-6 for increasing or decreasing the number of lines based upon the overflow or underflow.

Referring to FIG. 24, the process starts with a step S8-11 for extracting information with regard to the individual materials included in the article that has caused the overflow or underflow.

Next, in a step S8-12, the materials that are subjected to the adjustment are extracted. The process of the step S8-13 extracts the material having the smallest size and the order of applying the adjustment to the materials. In the example of increasing the number of lines, the materials are processed according to the order of: headings, highlightings, ruler lines, tables, and texts. On the other hand, when decreasing the number of lines, the materials are processed according to the order of: pictures, headings, ruler lines, and texts. The pictures may be eliminated from the list when there is an instruction not to cut pictures. Further, in a step of S8-13, a calculation is conducted with regard to the parameter of adjustment. Thus, when the number of the lines is decreased by one according to the order specified in the step S8-12 when there is an overflow. On the other hand, when there is an underflow, the number of lines is increased by one. When it is judged in the step S8-8 of FIG. 23 that there is no room for adjustment, the adjustment process is ended. On the other hand, when there still exists a need for adjustment, further adjustment is conducted until the overflow or underflow is eliminated.

Figure 25:
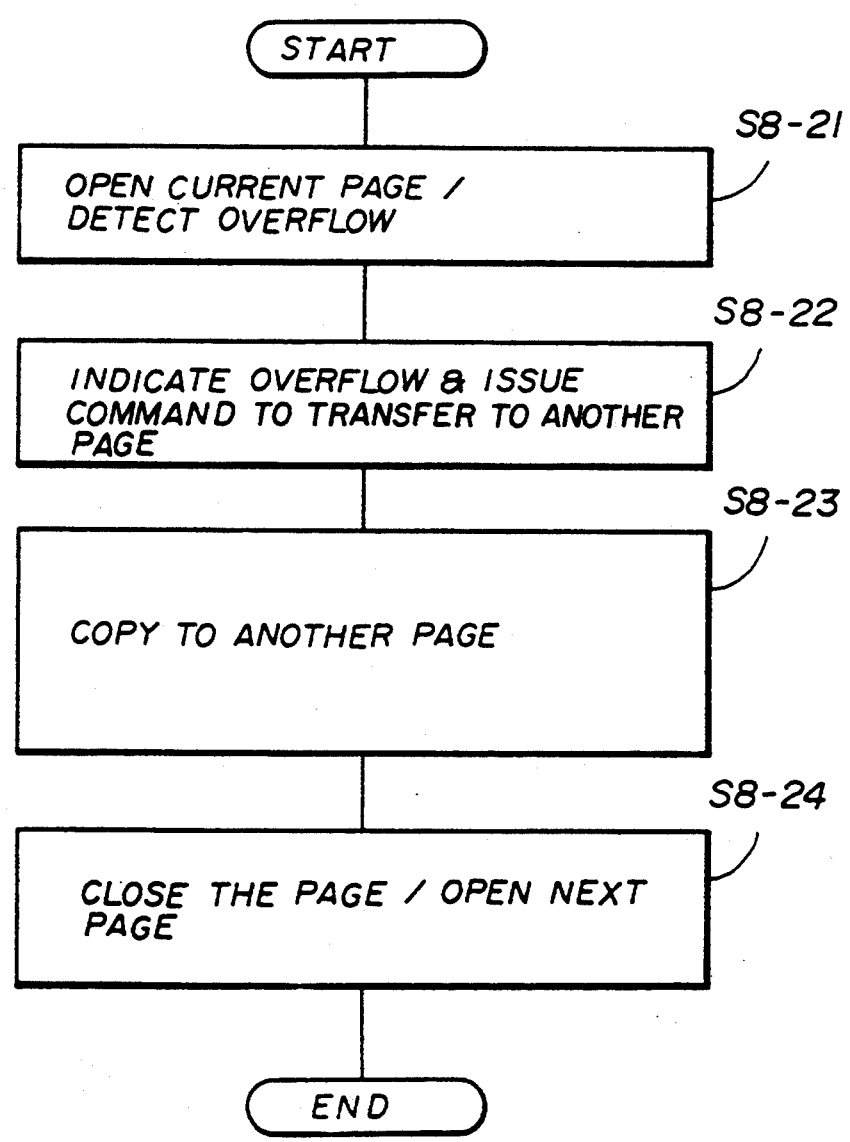
FIG. 25 is a flowchart showing the process of transferring a part of an article to another page.

FIG. 25 shows the process for transferring a part of the article to another page.

Referring to FIG. 25, the process starts with a step S8-21 wherein the materials are laid out consecutively on a current, first page. When there occurs an overflow, a step S8-22 is conducted to indicate the material that has caused the overflow. In response to this, a command for continuing the article to another page is issued. Next, in a step S8-23, the material that has caused the overflow is copied to another, second page and the column, wherein the overflow has occurred to a valid column, is set to be a valid column. Further, the column of the second page to which the material is copied is set to an underflow column. Further, in a step S8-24, the first page is closed and the second page is opened.

Thereby, it is displayed that the overflowed material is moved to the second page.

Figure 26:
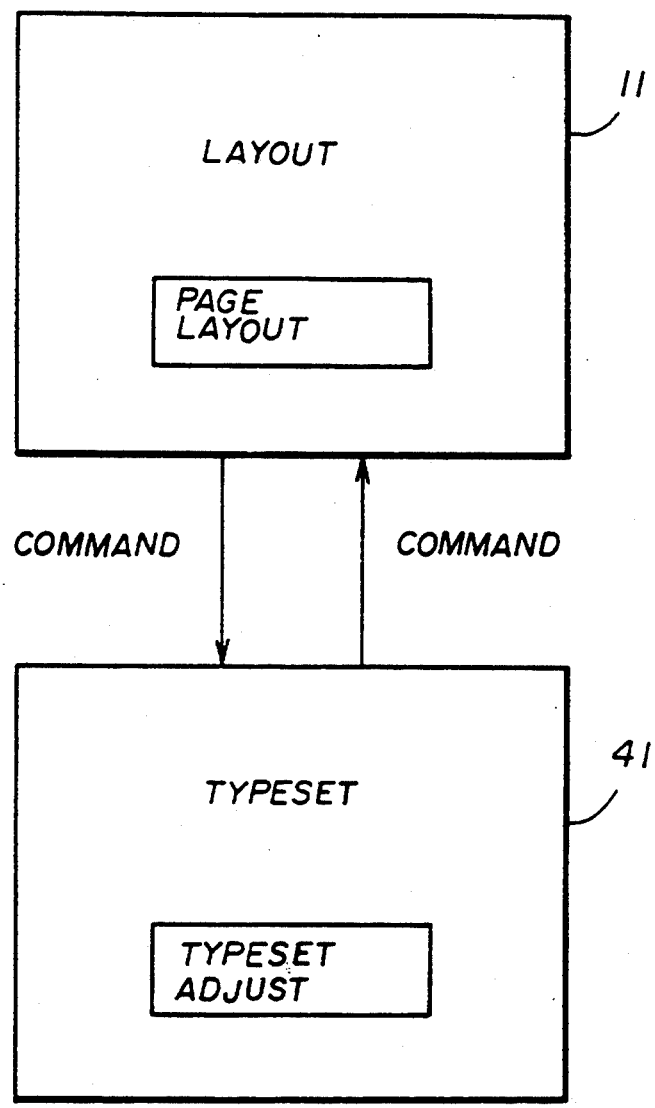
FIG. 26 is a block diagram showing the linking between the layout system and the typeset system in the system of FIG. 3.

FIG. 26 shows the overall operation of the computerized publishing system of the present invention. There, it will be noted that the layout system 11 creases a provisional page layout and supplies the same to the typeset system 41 in the form of commands, and the typeset system 41 creates a typeset by applying adjustment to the given layout. Further, the typeset thus obtained is fed back to the layout system in the form of commands for review of the operator. There, the operator can modify the layout as based upon the result of the typesetting, and by repeating the foregoing processes, one can achieve an ideal layout and typesetting with a minimum time, and without need of experience in the side of the operator.

FIGS. 28(A)–28(C) show the process for modifying the layout based upon the result of typesetting.

Figure 27A:
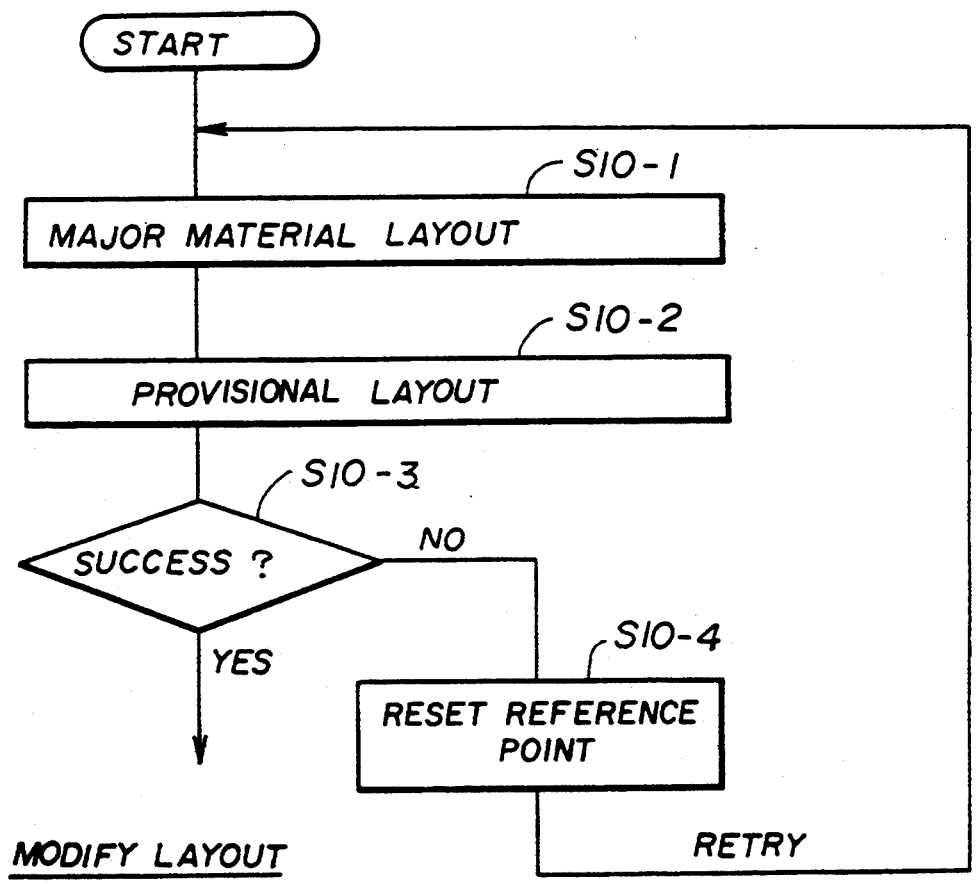

Referring to FIG. 27(A) showing the flowchart of the process, the process starts with a step S10-1 wherein the major materials are located based upon the given layout that corresponds to the result of the typesetting. Next, in a step S10-2, a provisional layout is conducted based upon the materials located in the step S10-2, and a discrimination is made in a step S10-3 whether the materials settle in the given article area or not. If YES, the page layout is determined based upon the provisional layout, while if the result is NO, the reference point is reset in a step S10-4. For example, if the location of the materials is unsuccessful with respect to the second article of the headline family (BNO=2) in the layout of FIG. 27(B), the location of the article is shifted in the downward direction by one column as shown in FIG. 27(C). Based upon the location of the materials in FIG. 27(C), the reference point is re-defined and the provisional layout of the step S10-2 is repeated, until a successful page layout is achieved.

According to the computerized publishing system of the present invention, an inexperienced personnel can achieve the layout and typeset efficiently. For example, the layout process and the typeset process can be conducted in a matter of five minutes, contrary to the conventional system that requires twenty minutes for each of the processes. In addition, one can reduce the period for becoming an expert from a conventional duration of two years to only one month.

It should be noted that the foregoing description of the invention has been made primarily with regard to the publishing of Japanese language newspapers. However, the present invention is by no means limited to such a specific case but can be applicable to the publications other than newspapers with a language other than Japanese.

Further, the present invention is not limited to the embodiments described heretofore, but various variations and modifications may be made without departing from the scope of the invention.

What is claimed is:

1. A method for laying out and typesetting in a computerized publishing system for producing successive issues of a publication, each issue having at least one page, comprising the steps of:

grouping together materials, that are to be laid out on a type area of a page, according to an article theme and so as to define a plurality of theme families such that each of said theme families contains a plurality of articles that share a common theme and such that each of said articles contains a plurality of materials;

classifying said plurality of articles into a variable article type wherein the materials belonging thereto have variable sizes and locations on said type area in successive issues and into another, fixed article type wherein the materials belonging thereto have a fixed size and location on said type area in successive issues, said step of classifying said articles comprising a step of adding a respective identifier to each article, of said plurality of articles, for identifying whether said article is a variable article type or a fixed article type;

assigning a theme rank to each of said theme families;

assigning an article rank to each of said articles;

adding information, as to each of said articles of said variable article type, to each of the materials that belong to said article for specifying, respectively, the size of the materials to be laid out on the type area and the theme rank and article rank of the article to which said materials belong;

storing said materials into a file together with said respective information;

laying out said materials, based upon said respective information added thereto, by reading out said materials from said file so as to determine a page layout, said step of laying out being conducted based upon said respective information and the laying out being effected while referring to a first knowledge base that stores rules of layout; and typesetting a page based upon said page layout so as to create a typeset, said step of typesetting being conducted while referring to a second knowledge base that stores rules of typesetting, said step of laying out said materials including a step of modifying said page layout based upon a result of said step of typesetting.

2. A method as claimed in claim 1, wherein said step of laying out, conducted according to said rules of layout stored in the first knowledge base, comprises the steps of:

selecting an article of the fixed article type based upon said identifier; and placing the materials belonging to said selected article on said type area, according to said respective information added to each of the materials.

3. A method as claimed in claim 2, wherein said respective information added to each material comprises an order of priority of the material, and wherein said step of placing the materials is conducted according to said order of priority.

4. A method as claimed in claim 2, wherein said step of laying out further comprises, after said step of selecting and placing the materials that belong to the article of the fixed article type, the steps of:

selecting articles of the variable article type, based upon said identifier added to said article;

selecting, from those articles selected in said preceding step, an indented article that is to be urged to an edge of said type area; and placing the materials belonging to said indented article, based upon the respective information added to said materials.

5. A method as claimed in claim 4, wherein said step of selecting the indented article is performed based upon attribute information which is associated with each of said articles, respectively, in said step of classifying said plurality of articles.

6. A method as claimed in claim 4, wherein said step of laying out further comprises a step of laying out the materials for the articles of variable article type, said step of laying out being performed after said steps of selecting and placing the materials that belong to the articles of the fixed article type and of placing the materials of the indented articles are completed.

7. A method as claimed in claim 1, wherein said step of laying out further comprises the steps of:
defining a reference point for each article of the variable article type; and
placing the materials belonging to said article on said type area with respect to said reference point according to an order of priority given to said materials.

8. A method as claimed in claim 7, wherein said step of placing the materials belonging to said article is conducted according to said respective information added to said materials.

9. A method as claimed in claim 7, wherein said order of priority of the materials is determined such that the material having the highest order of priority defines the size of the area that is to be occupied by said article, to which the materials belong, on said type area.

10. A method as claimed in claim 1, wherein said step of laying out further comprises the steps of:
displaying the result of said page layout; and
activating a human interface for receiving instructions for modification of said page layout.

11. A method as claimed in claim 10, wherein said step of laying out further comprises a step of modifying said Page layout with reference to said rules of layout stored in said first knowledge base.

12. A method as claimed in claim 1, wherein said step of laying out further comprises a step of processing a text in each article, said step of processing the text being performed after completion of the step of laying out with respect to materials other than text and further comprising the steps of:
searching for candidate styles for folding the text into one or more columns, in view of the page layout of the materials; and
selecting an optimum style for the text with reference to said first knowledge base.

13. A method as claimed in claim 1, wherein:
said step of typesetting is conducted by issuing commands indicative of said page layout; and
said step of modifying said page layout, based upon the result of said typesetting, is achieved by issuing commands indicative of the result of said typesetting.

14. A computerized publishing system for producing successive issues of a publication, each issue having at least one page, comprising:
information presetting means for grouping together materials, to be laid out on a type area of a page according to an article theme and so as to define a plurality of theme families such that each of said theme families contains a plurality of articles that share a common theme and such that each of said articles contains a plurality of materials, said information presetting means further classifying said plurality of articles into a variable article type wherein the materials belonging thereto have variable sizes and locations on said type area in successive issues, and into another, fixed article type wherein the materials belonging thereto have a fixed size and location on said type areas in successive issues, the classifying being effected by adding, to each of said plurality of articles, a respective identifier for identifying whether said article is a variable article type or a fixed article type, said information presetting means, further, assigning a theme rank to each of said theme families and an article rank to each of said articles and adding information, as to each of said articles of said variable article type, to each of the materials that belong to said article for specifying, respectively, the size of the materials that are to be laid out on the type area and the theme rank and the article rank of the article to which said materials belong;
preview layout means for laying out said materials, based upon said respective information added thereto, by reading out said materials from said file so as to determine a page layout, said preview layout means conducting said laying out of said materials based upon said respective information while referring to a first knowledge base that stores rules of layout;
layout modification means, supplied with said preview layout from said preview layout means, for modifying the preview layout so as to produce a page layout;
command generating means for generating commands for carrying out typesetting, based upon said page layout;
typesetting means, supplied with said commands from said command generating means, for creating a typeset and producing a signal corresponding to the typeset; and
feedback means for feeding back the signal, corresponding to said typeset, to said layout modification means as a page layout.

* * * * *

UNITED STATES PATENT AND TRADEMARK OFFICE
CERTIFICATE OF CORRECTION

PATENT NO. : 5,434,961
DATED : July 18, 1995
INVENTOR(S) : HORIUCHI et al.

It is certified that error appears in the above-indentified patent and that said Letters Patent is hereby corrected as shown below:

Col. 1, line 9, after "and" (second occurrence) insert --,--.

Col. 27, line 33 (claim 11, line 3), change "Page" to --page--.

Signed and Sealed this

Fourteenth Day of November, 1995

Attest:

BRUCE LEHMAN

*Attesting Officer*     *Commissioner of Patents and Trademarks*